US012241963B2

(12) United States Patent
Va et al.

(10) Patent No.: US 12,241,963 B2
(45) Date of Patent: Mar. 4, 2025

(54) ANGLE ESTIMATION WITH MULTI-FRAME PROCESSING FOR RADAR ON MOBILE DEVICES

(71) Applicant: Samsung Electronics Co., Ltd., Suwon-si (KR)

(72) Inventors: Vutha Va, Plano, TX (US); Boon Loong Ng, Plano, TX (US); Anum Ali, Plano, TX (US); Jianhua Mo, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 442 days.

(21) Appl. No.: 17/581,748

(22) Filed: Jan. 21, 2022

(65) Prior Publication Data
US 2022/0413120 A1  Dec. 29, 2022

Related U.S. Application Data

(60) Provisional application No. 63/215,039, filed on Jun. 25, 2021.

(51) Int. Cl.
| | |
|---|---|
| *G01S 13/68* | (2006.01) |
| *G01S 7/41* | (2006.01) |
| *G01S 13/42* | (2006.01) |
| *G01S 13/52* | (2006.01) |

(52) U.S. Cl.
CPC .............. *G01S 13/68* (2013.01); *G01S 7/415* (2013.01)

(58) Field of Classification Search
CPC ........ G01S 13/68; G01S 7/415; G01S 7/2921; G01S 7/2923; G01S 13/42; G01S 13/52; G01S 13/00; G01S 7/00; H04B 1/3827; G06F 1/3203
USPC .......................................................... 342/81
See application file for complete search history.

(56) References Cited

U.S. PATENT DOCUMENTS

| | | | |
|---|---|---|---|
| 9,024,823 B2 | 5/2015 | Bevelacqua | |
| 10,627,483 B2 | 4/2020 | Rao et al. | |
| 10,742,249 B2 | 8/2020 | Lan et al. | |
| 11,031,978 B2 | 6/2021 | Klemmer | |
| 2010/0130873 A1* | 5/2010 | Yuen | A61B 5/113 600/595 |
| 2020/0355817 A1* | 11/2020 | Gillian | G01S 7/4026 |
| 2021/0011147 A1 | 1/2021 | Va et al. | |
| 2021/0175919 A1* | 6/2021 | Badic | H04B 7/0408 |

(Continued)

*Primary Examiner* — Vladimir Magloire
*Assistant Examiner* — Remash R Guyah

(57) ABSTRACT

An electronic device includes a processor operably connected to a radar transceiver. The processor is configured to transmit, via the radar transceiver, radar signals to detect an object. The processor is also configured to detect the object using a single radar frame or multiple radar frames from the radar signals. The processor is further configured to determine whether to use the single radar frame or the multiple radar frames based on motion of the object for angle identification between the object and the electronic device. Additionally, the processor is configured to identify the angle using the single radar frame based on a determination to use the single radar frame or the multiple radar frames based on a determination to use the multiple radar frames. The processor is also configured to modify radio frequency exposure levels based on the angle of the object relative to the electronic device.

20 Claims, 21 Drawing Sheets

(56) References Cited

U.S. PATENT DOCUMENTS

2021/0349203 A1* 11/2021 Will .................. G01S 13/726
2024/0027600 A1* 1/2024 Saleem .................. G06N 3/08

* cited by examiner

ANGLE ESTIMATION WITH MULTI-FRAME PROCESSING FOR RADAR ON MOBILE DEVICES

CROSS-REFERENCE TO RELATED APPLICATION AND CLAIM OF PRIORITY

This application claims priority under 35 U.S.C. § 119(e) to U.S. Provisional Patent Application No. 63/215,039 filed on Jun. 25, 2021. The above-identified provisional patent application is hereby incorporated by reference in its entirety.

TECHNICAL FIELD

This disclosure relates generally to electronic devices. More specifically, this disclosure relates to angle estimation with multi-frame processing for radar on mobile devices.

BACKGROUND

The use of mobile computing technology such as a portable electronic device has greatly expanded largely due to usability, convenience, computing power, and the like. One result of the recent technological development is that electronic devices are becoming more compact, while the number of functions and features that a given device can perform is increasing. For example, certain electronic devices not only provide voice call services or internet browsing using a mobile communication network but can also offer radar capabilities.

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. With the increase of mobile communication, care must be taken to minimize radio frequency exposure to the user of the electronic device.

SUMMARY

This disclosure relates to angle estimation with multi-frame processing for radar on mobile devices.

In one embodiment, electronic device is provided. The electronic device includes a radar transceiver and a processor. The processor is operably connected to the radar transceiver. The processor is configured to transmit, via the radar transceiver, radar signals to detect an object within regions expanding from electronic device. The processor is also configured to detect the object using a single radar frame or multiple radar frames from the radar signals. The processor is further configured to determine whether to use the single radar frame or the multiple radar frames based on motion of the object for angle identification between the object and the electronic device. Additionally, the processor is configured to identify the angle between the object and the electronic device using (i) the single radar frame based on a determination to use the single radar frame or (ii) the multiple radar frames based on a determination to use the multiple radar frames. The processor is also configured to modify radio frequency exposure levels at one or more of the regions based on the angle of the object relative to the electronic device.

In another embodiment, a method is provided. The method includes transmitting radar signals to detect an object within regions expanding from electronic device. The method also includes detecting the object using a single radar frame or multiple radar frames from the radar signals. The method further includes determining whether to use the single radar frame or the multiple radar frames based on motion of the object for angle identification between the object and the electronic device. Additionally, the method includes identifying the angle between the object and the electronic device using (i) the single radar frame based on a determination to use the single radar frame or (ii) the multiple radar frames based on a determination to use the multiple radar frames. The method also includes modifying radio frequency exposure levels at one or more of the regions based on the angle of the object relative to the electronic device.

In yet another embodiment a non-transitory computer readable medium embodying a computer program is provided. The computer program comprising computer readable program code that, when executed by a processor of an electronic device, causes the processor to transmit radar signals to detect an object within regions expanding from electronic device; detect the object using a single radar frame or multiple radar frames from the radar signals; determine whether to use the single radar frame or the multiple radar frames based on motion of the object for angle identification between the object and the electronic device; identify the angle between the object and the electronic device using (i) the single radar frame based on a determination to use the single radar frame or (ii) the multiple radar frames based on a determination to use the multiple radar frames; and modify radio frequency exposure levels at one or more of the regions based on the angle of the object relative to the electronic device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
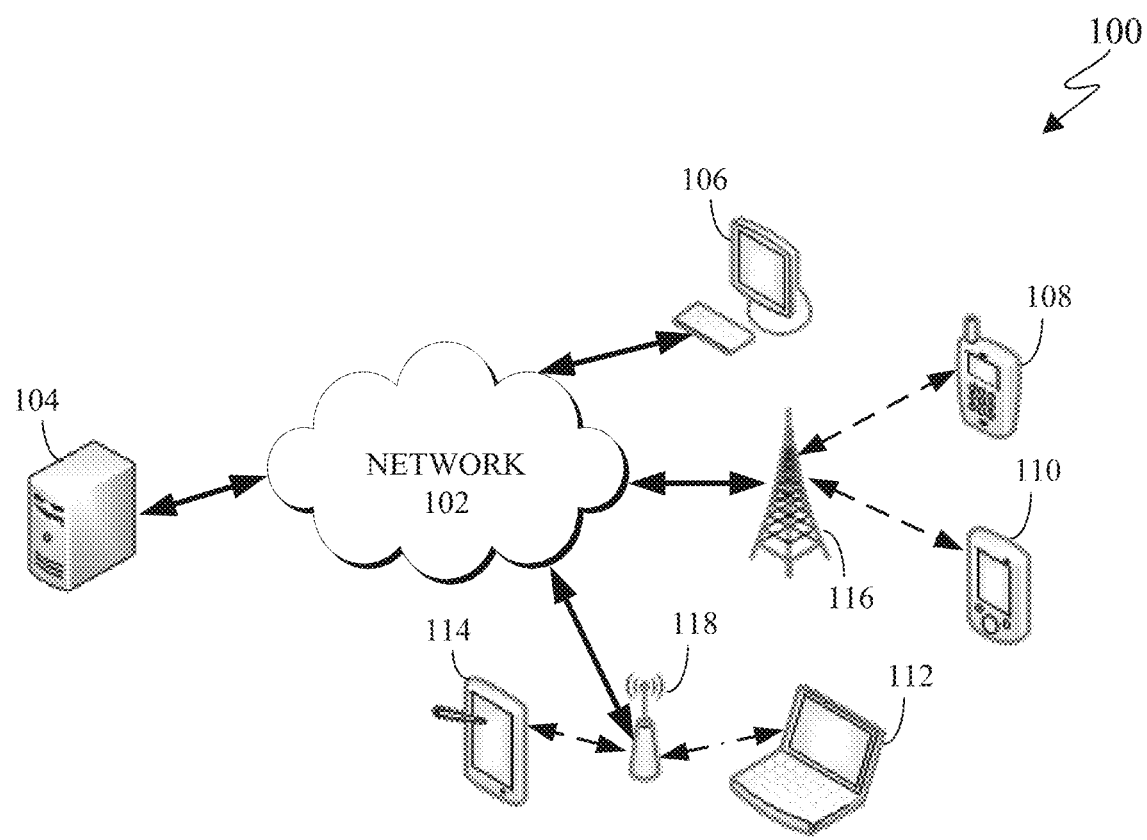
FIG. 1 illustrates an example communication system according to embodiments of this disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

To meet the demand for wireless data traffic having increased since deployment of the fourth generation (4G) communication systems, efforts have been made to develop and deploy an improved 5th generation (5G) or pre-5G or new radio (NR) communication system. Therefore, the 5G or pre-5G communication system is also called a "beyond 4G network" or a "post long term evolution (LTE) system."

The 5G communication system is considered to be implemented in higher frequency (such as millimeter wave (mm-Wave)) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

An electronic device, according to embodiments of the present disclosure can include a user equipment (UE) such as a 5G terminal. The electronic device can also refer to any component such as mobile station, subscriber station, remote terminal, wireless terminal, receive point, vehicle, or user device. The electronic device could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. Additionally, the electronic device can include a personal computer (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), a portable multimedia player (PMP), an MP3 player, a mobile medical device, a virtual reality headset, a portable game console, a camera, and a wearable device, among others. Additionally, the electronic device can be at least one of a part of a piece of furniture or building/structure, an electronic board, an electronic signature receiving device, a projector, or a measurement device. The electronic device is one or a combination of the above-listed devices. Additionally, the electronic device as disclosed herein is not limited to the above-listed devices and can include new electronic devices depending on the development of technology. It is noted that as used herein, the term "user" may denote a human or another device (such as an artificial intelligent electronic device) using the electronic device.

Figure 4A:
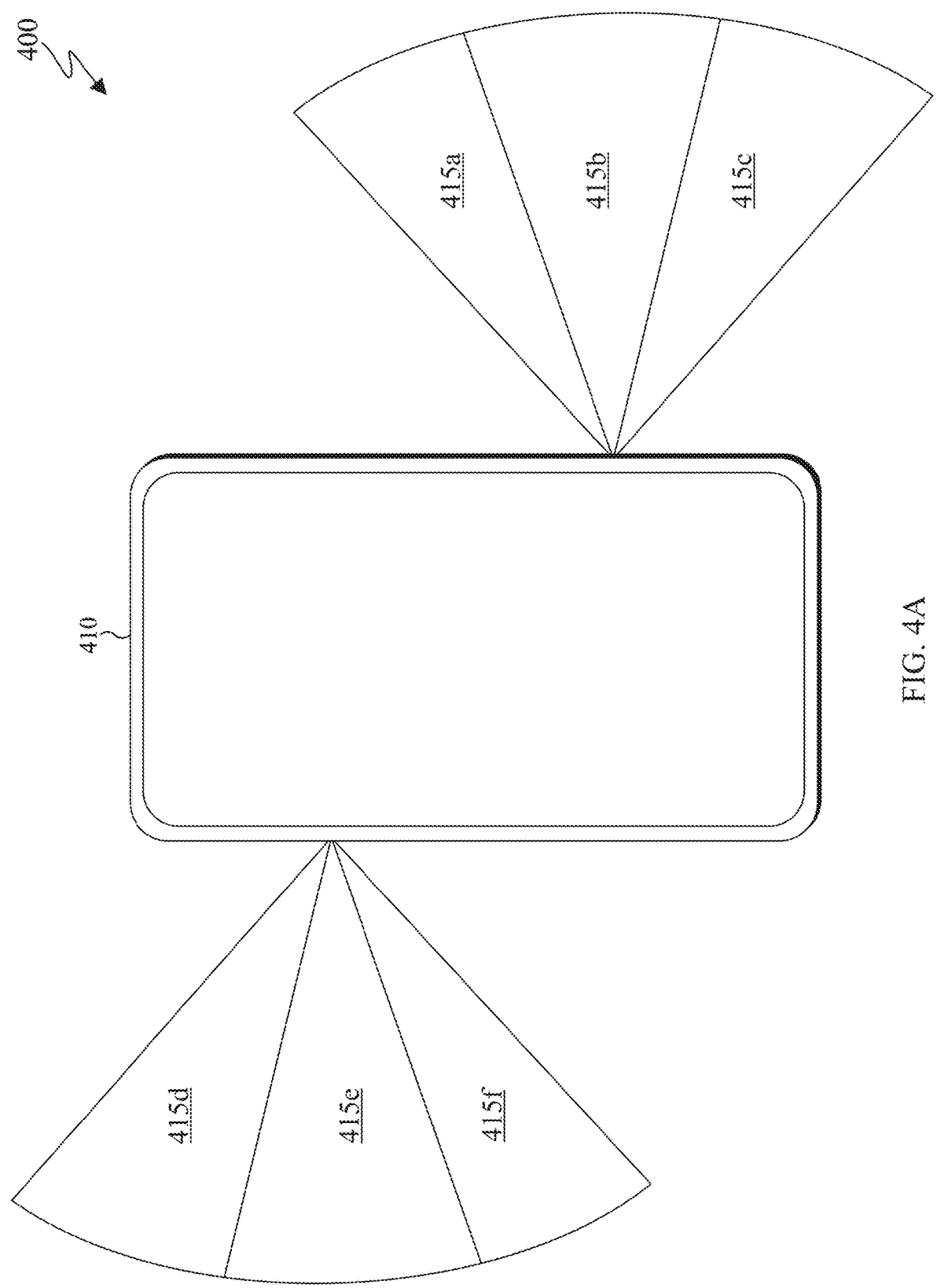
FIG. 4A illustrates a diagram of an electronic device with multiple field of view regions corresponding to beams according to embodiments of this disclosure.

Beamforming is an important factor when an electronic device (such as a UE) tries to establish a connection with a base station (BS). To compensate for the narrower analog beamwidth in mmWave, analog beams sweeping can be employed to enable wider signal reception or transmission coverage for the UE. A beam codebook comprises a set of codewords, where a codeword is a set of analog phase shift values, or a set of amplitude plus phase shift values, applied to the antenna elements, in order to form an analog beam. FIG. 4A, described below, illustrates a UE equipped with two mmWave antenna modules or panels located on the left and the right edges of the UE. A beam management procedure is implemented at the UE to maintain the best antenna module as well as the corresponding best beam of the antenna module for signal reception and transmission by the UE. The UE may also use multiple antenna modules simultaneously, in which case the beam management procedure can determine the best beam of each antenna module for signal reception and transmission by the UE.

Embodiments of the present disclosure take into consideration that beamforming is a used for reliable mmWave communications but at the same time beamforming also can cause a concern for radio frequency exposure on human body, beyond various governmental regulations. Beamforming is typically used at both the infrastructure or network side (such as at the base station or the access point) and the UE side. The process of beamforming is to adjust the antenna weights such that the transmission energy is concentrated in some direction. This focus of energy can help provide strong link signal for communications, but at the same time this means more radiation power in that direction and could raise concern on the exposure to body of the user. Due to such health concern, regulatory bodies (such as the Federal Communications Commission (FCC) in the United States of America) have sets of regulations and guidance governing such exposure. Exposure includes both exposure at low frequency (<6 GHz) and exposure at high frequency (>6 GHz). Power density (PD) is used as the exposure metric at high frequency.

Exposure limit poses a challenge regarding 5G millimeter wave uplink (UL). As discussed above, narrow beams (formed by beamforming techniques) are used for 5G millimeter wave operation, however, beamforming increases the PD and, consequently, the exposure. Certain mmWave communications take a very conservative measure to meet the exposure regulations. For example, one such approach is to use low enough Equivalent Isotropically Radiated Power (EIRP) by adjusting the duty cycle and either (i) lowering the transmit (TX) power, (ii) lowering the antenna gain, or (iii) both lower the TX power and the antenna gain.

Embodiments of the present disclosure take into consideration that while such a conservative measure can ensure regulatory compliance, it forces the communication module to operate at suboptimal link quality and thus the electronic device cannot reap the potential for very high data rate services. For example, some solutions (non-sensing solutions) assume worst case exposure. Embodiments of the present disclosure take into consideration that to guard against exceeding the limit, using low power, using wide beams, or a combination thereof. Using low power or wide beams can limit UL quality in both coverage and throughput.

Accordingly, embodiments of the present disclosure relate to using radar to assess a situation by sensing the surroundings of the electronic device. By assessing the situation, the electronic device can avoid a pessimistic TX power control. For example, a smart exposure control solution can keep exposure compliance while minimizing the opportunity loss for communication beamforming operations. Embodiments of the present disclosure describe using radar to both detect a body part and determine a direction that the body part is present. Upon detecting a body part and determining its location, the electronic device can manage the beams for communication to maintain regulatory RF exposure compliance while operating at enhanced link quality.

Radar sensing can be used for ranging, angle or both. For example, when radar is used for ranging only, the electronic device can determine whether a human body part is present and adjust the TX power. For another example, when radar is used for ranging and angle, the electronic device can determine whether a human body part is present and its approximate location and adjust the TX power, for beamforming, based on the location of the human body part. For instance, the electronic device can reduce the TX power at or near the location of the human body part and increase the TX power at locations where the human body part is absent. For yet another example, when radar is used for ranging and angle, the electronic device can determine whether a human body part is present and its approximate location and select one or more beams for beamforming based on the location of the human body part. In this example, the angle information can be used to identify if the body part is within the main beam direction of certain beams.

Embodiments of the present disclosure take into consideration that the regulatory bodies limit exposure due to such health concern with respect to a human body and not inanimate objects. Accordingly, embodiments of the present disclosure relate to using radar to distinguish between a human body part and an inanimate object, such as a table. One way to distinguish body part from other objects (such as inanimate objects) is to rely on movement. For example, there are always some micro-movement of the live body (such as breathing cycles or some other involuntary muscle activities). While micro-movements are a good identifier of a human body, it can be quite challenging to reliably detect these minor movements in a static setting as it may require a very long radar frame duration.

Embodiments of the present disclosure take into consideration that while longer processing frames are able to identify small movements of the human body, it can introduce ambiguity in angle estimation when the body part has a large motion. For example, if the object moves over a certain amount the electronic device may be unable to determine the angle that the object is relative to the electric device due to a smearing effect. Accordingly, embodiments of the present disclosure relate to determining whether to use a single radar frame or multiple radar frames for detecting movement, performing angle estimation, and determining whether the object is a human body part or an inanimate object.

Embodiments of the present disclosure also relate to methods for indirectly assessing the speed of an object (also referred to as a target) to select a duration to derive a spatial covariance matrix. For example, using long radar frames can improve the quality of the spatial covariance matrix in terms of signal to noise ratio if the target stays relatively static during the radar frame. It is noted that indirectly assessing the speed of an object is used since certain embodiments of the present disclosure use non-uniform radar pulse spacing and the speed of the object may not be directly estimated. Additionally, embodiments of the present disclosure describe performing angle estimation when using multiple-frame radar detection with non-uniform pulse spacing. For example, when the object is moving fast, embodiments of the present disclosure describe using a short frame duration. For another example, when the object is moving slow or remaining stationary (except for micro-movements), embodiments of the present disclosure describe using a longer frame (or multiple frames) for the spatial covariance matrix.

While the descriptions of the embodiments of the present discloser, describe a radar based system for object detection and motion detection, the embodiments can be applied to any other radar based and non-radar based recognition systems. That is, the embodiments of the present disclosure are not restricted to radar and can be applied to other types of sensors (such as an ultrasonic sensor) that can provide both range, angle, speed measurements, or any combination thereof. It is noted that when applying the embodiments of the present disclosure using a different type of sensor (a sensor other than a radar transceiver), various components may need to be tuned accordingly.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone (such as a UE), a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100, such as wearable devices. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a measuring (or radar) transceiver.

In this example, some client devices 108-114 communicate indirectly with the network 102. For example, the mobile device 108 and PDA 110 communicate via one or more base stations 116, such as cellular base stations or eNodeBs (eNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
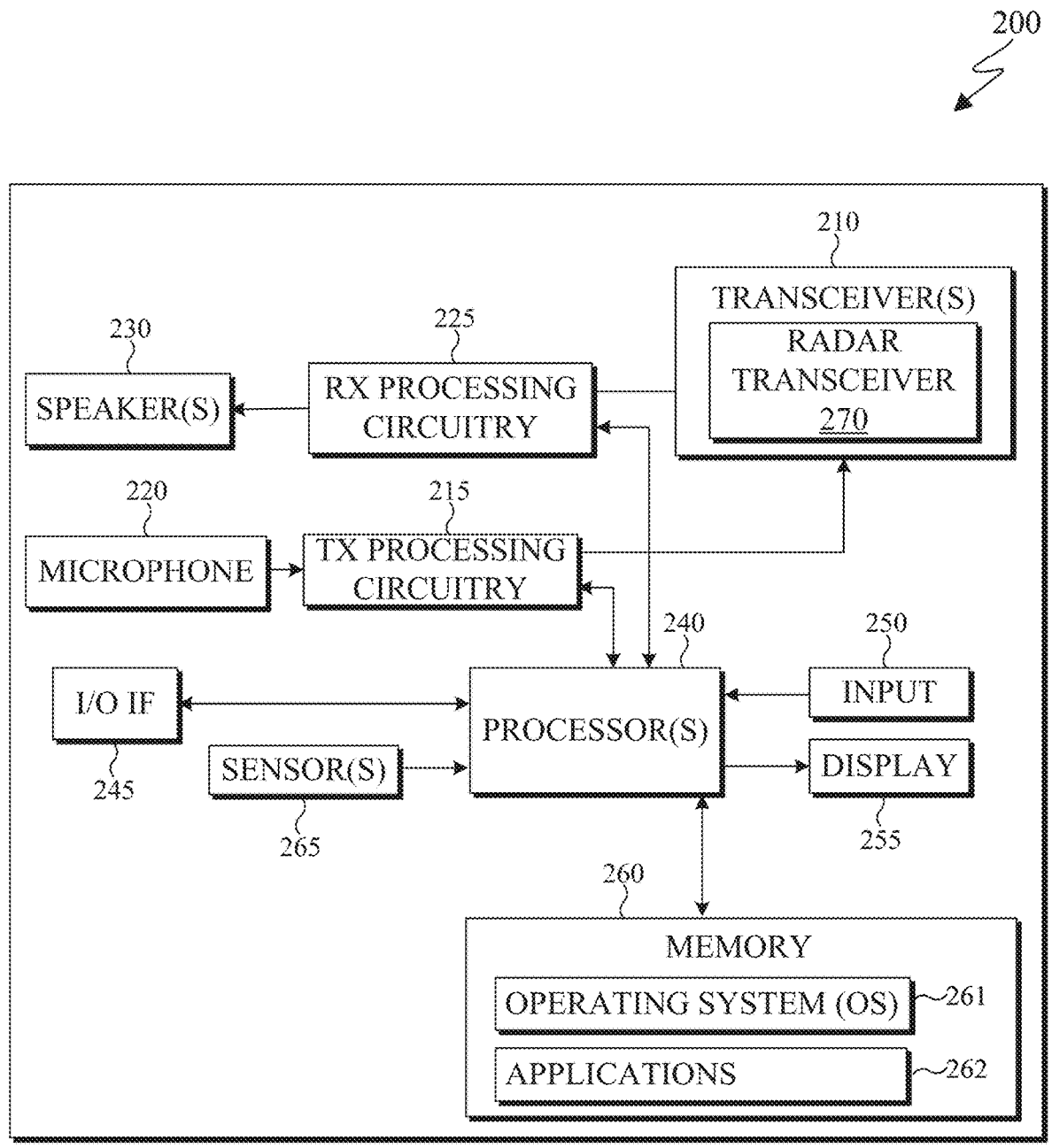
FIG. 2 illustrates an example electronic device according to embodiments of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a UE, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array including numerous antennas. For example, the transceiver(s) 210 can be equipped with multiple antenna elements. There can also be one or more antenna modules fitted on the terminal where each module can have one or more antenna elements. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, the radar transceiver 270, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

In this embodiment, one of the one or more transceivers in the transceiver 210 is a radar transceiver 270 that is configured to transmit and receive signals for detecting and ranging purposes. The radar transceiver 270 can transmit and receive signals for measuring range and speed of an object that is external to the electronic device 200. The radar transceiver 270 can also transmit and receive signals for measuring the angle a detected object relative to the electronic device 200. For example, the radar transceiver 270 can transmit one or more signals that when reflected off of a moving object and received by the radar transceiver 270 can be used for determining the range (distance between the object and the electronic device 200), the speed of the object, the angle (angle between the object and the electronic device 200), or any combination thereof.

Figure 3A:
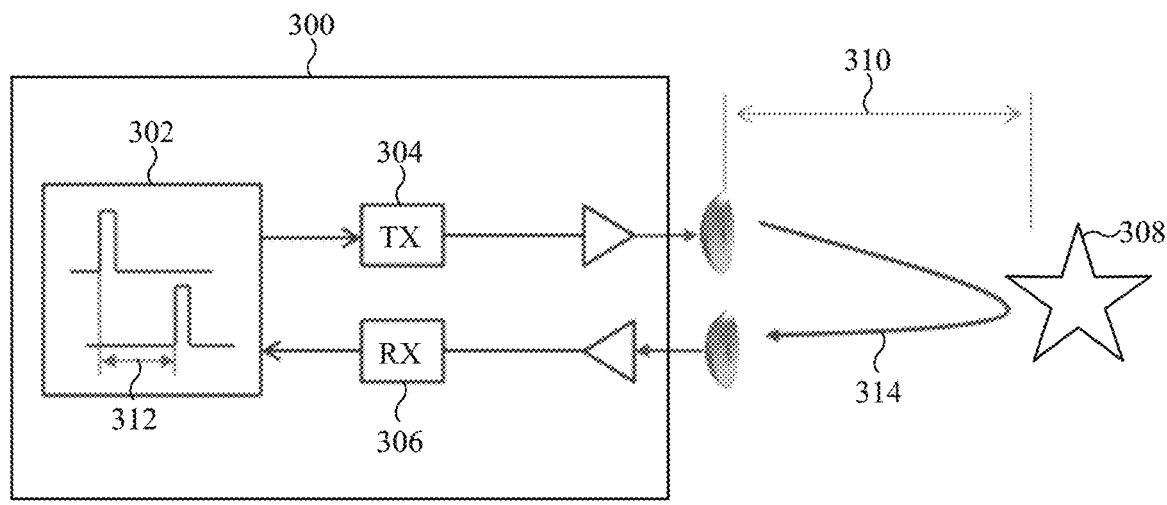
FIG. 3A illustrates an example architecture of a monostatic radar signal according to embodiments of this disclosure.

The radar transceiver 270 may be any type of transceiver including, but not limited to a radar transceiver. The radar transceiver 270 can includes a radar sensor. The radar transceiver 270 can receive the signals, which were originally transmitted from the radar transceiver 270, after the signals have bounced or reflected off of target objects in the surrounding environment of the electronic device 200. In certain embodiments, the radar transceiver 270 is a monostatic radar as the transmitter of the radar signal and the receiver, for the delayed echo, are positioned at the same or similar location. For example, the transmitter and the receiver can use the same antenna or nearly-co-located while using separate, but adjacent antennas. Monostatic radars are assumed coherent, such as when the transmitter and receiver are synchronized via a common time reference. FIG. 3A, below, illustrates an example monostatic radar.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

Figure 3B:
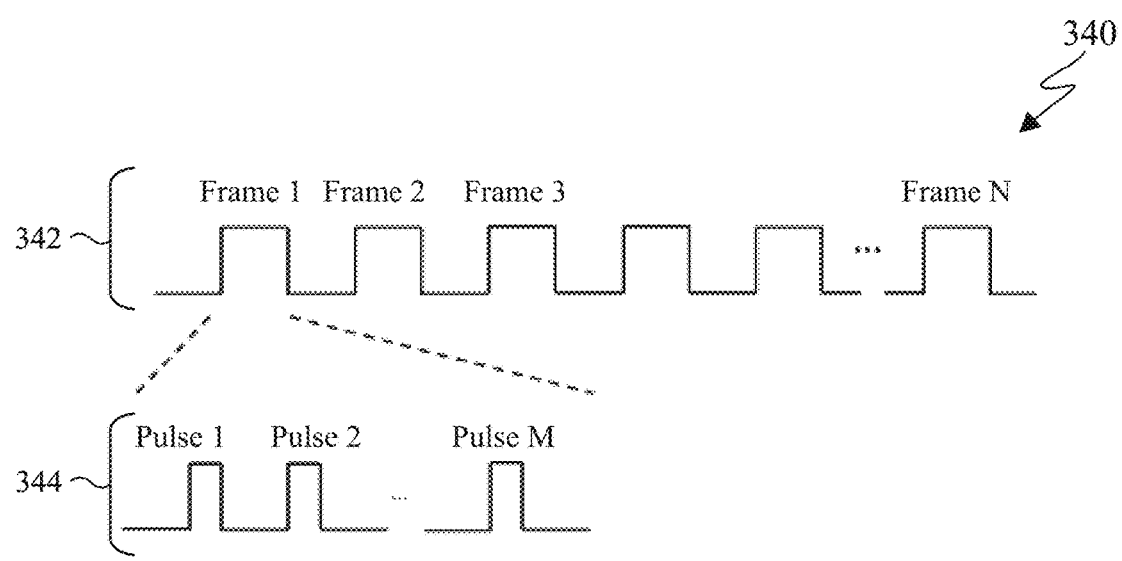
FIG. 3B illustrates an example frame structure according to embodiments of this disclosure.
Figure 3C:
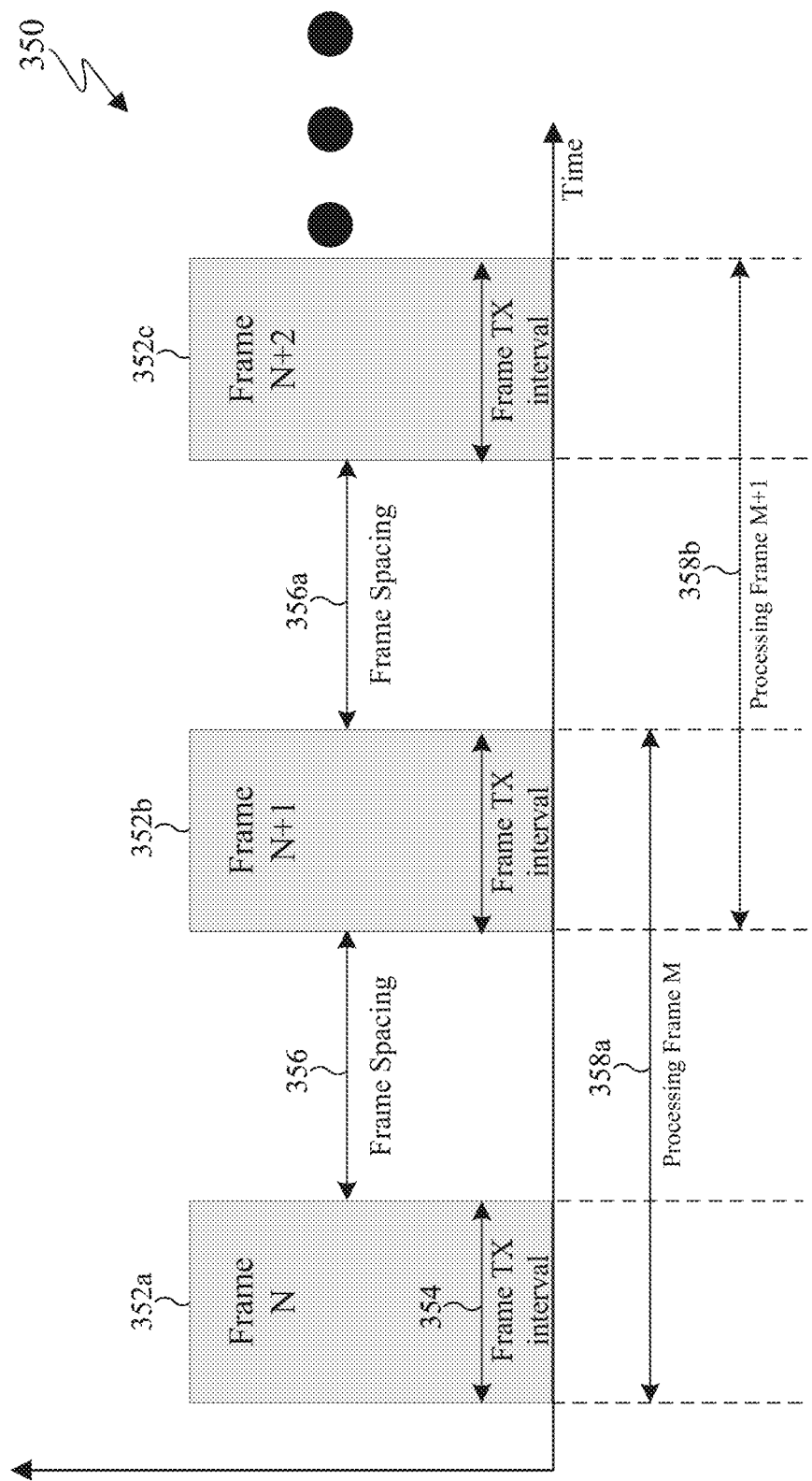
FIG. 3C illustrates an example detailed frame structure according to embodiments of this disclosure.
Figure 3D:
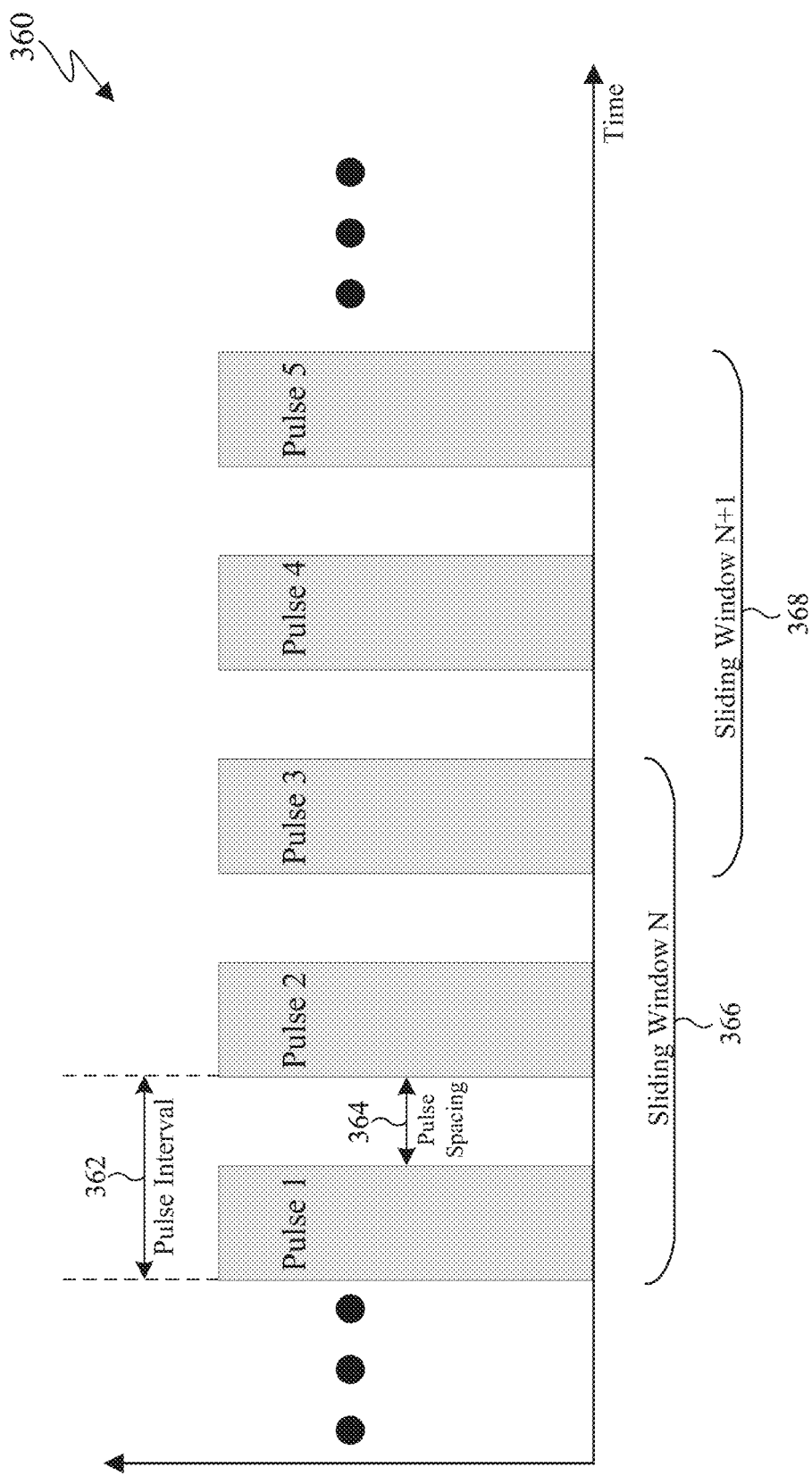
FIGS. 3D and 3E illustrates example pulse structures according to embodiments of this disclosure.
Figure 3E:
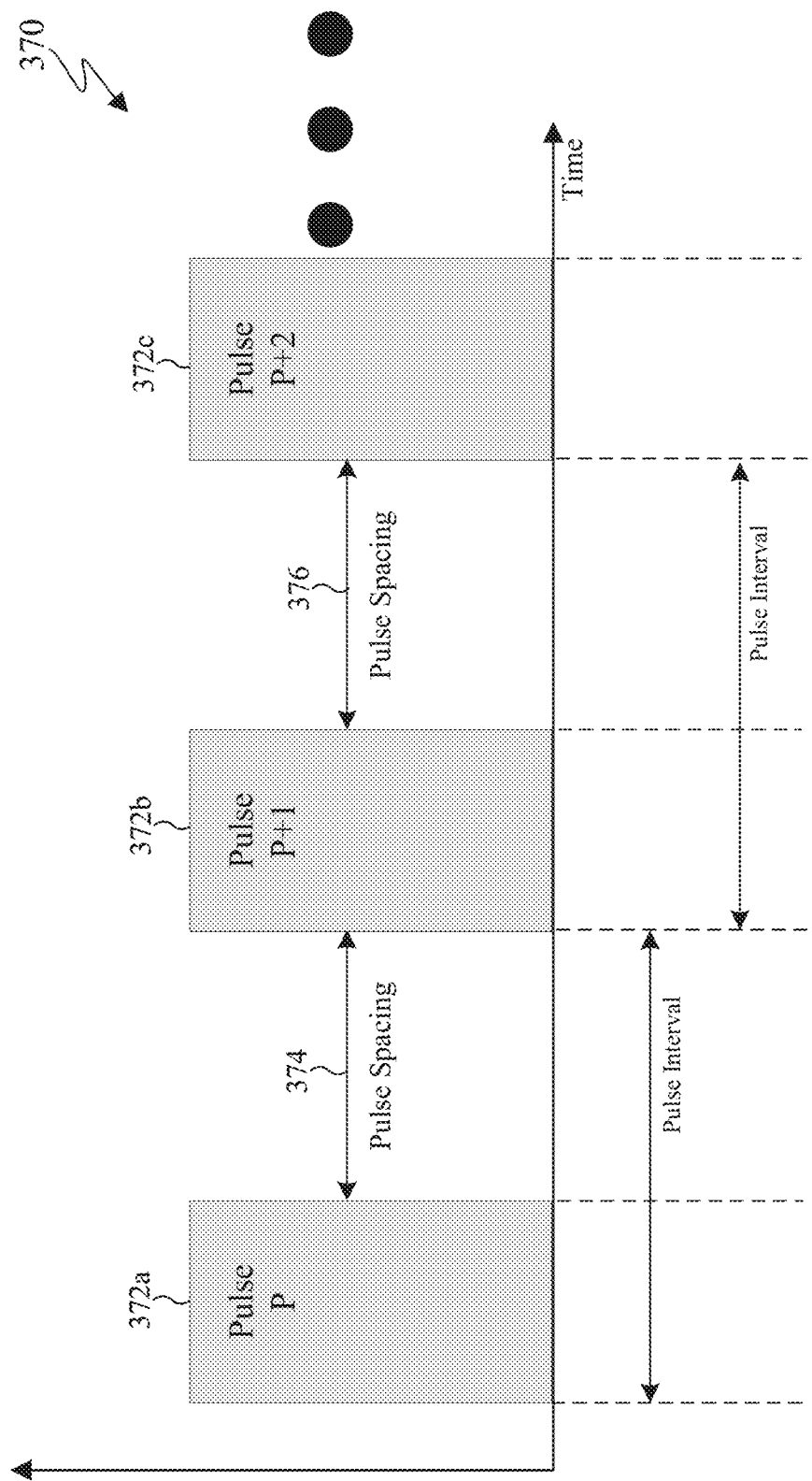

FIG. 3A illustrates an example architecture of a monostatic radar in accordance with an embodiment of this disclosure. FIG. 3B illustrates an example frame structure 340 in accordance with an embodiment of this disclosure. FIG. 3C illustrates an example detailed frame structure 350 according to embodiments of this disclosure. FIGS. 3D and 3E illustrates example pulse structures 360 and 370, respectively, according to embodiments of this disclosure. The embodiments of FIGS. 3A-3E are for illustration only and other embodiments can be used without departing from the scope of the present disclosure.

FIG. 3A illustrates an electronic device 300 that includes a processor 302, a transmitter 304, and a receiver 306. The electronic device 300 can be similar to any of the client devices 106-114 of FIG. 1, the server 104 of FIG. 1, or the electronic device 200 of FIG. 2. The processor 302 is similar to the processor 240 of FIG. 2. Additionally, the transmitter 304 and the receiver 306 can be included within the radar transceiver 270 of FIG. 2.

The transmitter 304 of the electronic device 300 transmits a signal 314 to the target object 308. The target object 308 is located a distance 310 from the electronic device 300. For example, the transmitter 304 transmits a signal 314 via an antenna. In certain embodiments, the target object 308 correspond to a human body part. The signal 314 is reflected off of the target object 308 and received by the receiver 306, via an antenna. The signal 314 represents one or many signals that can be transmitted from the transmitter 304 and reflected off of the target object 308. The processor 302 can identify the information associated with the target object 308, such as the speed the target object 308 is moving and the distance the target object 308 is from the electronic device 300, based on the receiver 306 receiving the multiple reflections of the signals, over a period of time.

Leakage (not shown) represents radar signals that are transmitted from the antenna associated with transmitter 304 and are directly received by the antenna associated with the receiver 306 without being reflected off of the target object 308.

In order to track the target object 308, the processor 302 analyzes a time difference 312 from when the signal 314 is transmitted by the transmitter 304 and received by the receiver 306. It is noted that the time difference 312 is also referred to as a delay, as it indicates a delay between the transmitter 304 transmitting the signal 314 and the receiver 306 receiving the signal after the signal is reflected or bounced off of the target object 308. Based on the time difference 312, the processor 302 derives the distance 310 between the electronic device 300, and the target object 308. Additionally, based on multiple time differences 312 and changes in the distance 310, the processor 302 derives the speed that the target object 308 is moving.

Monostatic radar is characterized for its delayed echo as the transmitter 304 of the radar signal and the receiver 306 of the radar signal essentially are at the same location. In certain embodiments, the transmitter 304 and the receiver 306 are co-located either by using a common antenna or nearly co-located but use separate but adjacent antennas. Monostatic radars are assumed coherent such that the transmitter 304 and the receiver 306 are synchronized via a common time reference.

A radar pulse is generated as a realization of a desired radar waveform, modulated onto a radio carrier frequency, and transmitted through a power amplifier and antenna, such as a parabolic antenna. In certain embodiments, the pulse radar is omnidirectional. In other embodiments, the pulse radar is focused into a particular direction. When the target object 308 is within the field of view of the transmitted signal and within a distance 310 from the radar location, then the target object 308 will be illuminated by RF power density (W/m$^2$), $p_t$, for the duration of the transmission. Equation (1) describes the first order of the power density, $p_t$.

$$p_t = \frac{P_T}{4\pi R^2} G_T = \frac{P_T}{4\pi R^2} \frac{A_T}{(\lambda^2/4\pi)} = P_T \frac{A_T}{\lambda^2 R^2} \qquad (1)$$

Referring to Equation (1), $P_T$ is the transmit power (W). $G_T$ describes the transmit antenna gain (dBi) and $A_T$ is an effective aperture area (m$^2$). $\lambda$ corresponds to the wavelength of the radar signal (m), and R corresponds to the distance 310 between the antenna and the target object 308. In certain embodiments, effects of atmospheric attenuation, multi-path propagation, antenna loss and the like are negligible, and therefore not addressed in Equation (1).

The transmit power density impinging onto the target object 308 surface can cause reflections depending on the material, composition, surface shape and dielectric behavior at the frequency of the radar signal. In certain embodiments, only direct reflections contribute to a detectable receive signal since off-direction scattered signals can be too weak to be received by at the radar receiver. The illuminated areas of the target with normal vectors pointing back at the receiver can act as transmit antenna apertures with directives (gains) in accordance with their effective aperture areas. Equation (2), below, describes the reflective back power.

$$P_{refl} = p_t A_t G_t \sim p_t A_t r_t \frac{A_t}{\lambda^2/4\pi} = p_t RSC \qquad (2)$$

In Equation (2), $P_{refl}$ describes the effective isotropic target-reflected power (W). The term, $A_t$, describes the effective target area normal to the radar direction (m$^2$). The term $r_t$ describes the reflectivity of the material and shape, which can range from [0, . . . , 1]. The term $G_t$ describes the corresponding aperture gain (dBi). RSC is the radar cross section (m²) and is an equivalent area that scales proportional to the actual reflecting area-squared inversely proportional with the wavelength-squared and is reduced by various shape factors and the reflectivity of the material itself. Due to the material and shape dependency, it is difficult to deduce the actual physical area of a target from the reflected power, even if the distance 310 to the target object 308 is known.

The target reflected power at the receiver location results from the reflected power density at the reverse distance 310 collected over the receiver antenna aperture area. Equation (3), below, describes the received target reflected power. It is noted that $P_R$ is the received target reflected power (W) and $A_R$ is the receiver antenna effective aperture area (m²). In certain embodiments, $A_R$ is the same as $A_r$.

$$P_R = \frac{P_{refl}}{4\pi R^2} A_R = P_T \cdot RSC \frac{A_T A_R}{4\pi \lambda^2 R^4} \tag{3}$$

A radar system can be used as long as the receiver signal exhibits sufficient signal-to-noise ratio (SNR). The value of SNR depends on the waveform and detection method. Equation (4), below, describes the SNR. It is noted that kT is the Boltzmann constant multiplied by the current temperature. B is the radar signal bandwidth (Hz). F is the receiver noise factor which is a degradation of the receive signal SNR due to noise contributions of the receiver circuit itself.

$$SNR = \frac{P_R}{kT \cdot B \cdot F} \tag{4}$$

When the radar signal is a short pulse of duration or width, $T_p$, the delay or time difference 312 between the transmission and reception of the corresponding echo is described in Equation (5). τ corresponds to the delay between the transmission and reception of the corresponding echo and equal to Equation (5). c is the speed of light propagation in the air. When there are multiple targets at different distances, individual echoes can be distinguished only if the delays differ by at least one pulse width. As such, the range resolution of the radar is described in Equation (6). A rectangular pulse of a duration $T_P$ exhibits a power spectral density as described in Equation (7) and includes a first null at its bandwidth as shown in Equation (8). The range resolution of a radar signal is connected with the bandwidth of the radar waveform is expressed in Equation (9).

$$\tau = 2R/c \tag{5}$$

$$\Delta R = c\Delta\tau/2 = cT_P/2 \tag{6}$$

$$P(f) \sim (\sin(\pi f T_p)/(\pi f T_p))^2 \tag{7}$$

$$B = 1/T_P \tag{8}$$

$$\Delta R = c/2B \tag{9}$$

Depending on the radar type, various forms of radar signals exist. One example is a Channel Impulse Response (CIR). CIR measures the reflected signals (echoes) from potential targets as a function of distance at the receive antenna module, such as the radar transceiver 270 of FIG. 2. In certain embodiments, CIR measurements are collected from transmitter and receiver antenna configurations which when combined can produce a multidimensional image of the surrounding environment. The different dimensions can include the azimuth, elevation, range, and Doppler.

The speed resolution (such as the Doppler resolution) of the radar signal is proportional to the radar frame duration. Radar speed resolution is described in Equation (10), below.

$$\Delta v = \frac{\lambda}{2T_{tx-frame}} \tag{10}$$

Here, λ is the wavelength of the operating frequency of the radar, and $T_{tx-frame}$ is the duration of active transmission (simply called the radar frame duration here) of the pulses in the radar frame.

The example frame structure 340 of FIG. 3B illustrates an example raw radar measurement. The frame structure 340 describes that time is divided into frames 342, where each frame has an active transmission period and a silence period, denoted as frame spacing. During the active transmission period, M pulses 344 may be transmitted. For example, the example frame structure 340 includes frame 1, frame 2, frame 3, through frame N. Each frame includes multiple pulses 344, such as pulse 1, pulse 2 through pulse M.

In certain embodiments, different transmit and receive antenna configurations activate for each pulse or each frame. In certain embodiments, different transmit or receive antenna configurations activate for each pulse or each frame. It is noted that although the example frame structure 340 illustrates only one frame type, multiple frame types can be defined in the same frame, where each frame type includes a different antenna configuration. Multiple pulses can be used to boost the SNR of the target or may use different antenna configurations for spatial processing.

In certain embodiments, each pulse or frame may have a different transmit/receive antenna configuration corresponding to the active set of antenna elements and corresponding beamforming weights. For example, each of the M pulses in a frame can have different transmit and receive antenna pair allowing for a spatial scan of the environment (such as using beamforming), and each of the frames 342 all repeat the same pulses.

The example frame structure 340 illustrates uniform spacing between pulses and frames. In certain embodiments, any spacing, even non-uniform spacing, between pulses and frames can be used.

Long radar frames can be used to generate reliable detection of an object even when there is only minor and weak movement, since there is a higher chance that movement will occur during a long frame. To minimize the cost of using long radar frames, embodiments of the present disclosure describe processing multiple radar frames to increase the radar observation time while keeping the same or similar effective radar transmission cycle.

FIG. 3C illustrates a detailed frame structure 350 according to embodiments of this disclosure. The detailed frame structure 350 can be similar to the frames 342 of FIG. 3B. The detailed frame structure 350 includes frames 352a, 352b, and 352c. Each frame, such as frame 352a, has a specific transmission interval 354. Similarly, each of the frames are separated by a frame spacing interval, such as the frame spacing interval 356 and the frame spacing interval 356a. For example, frame 352a and frame 352b are separated by the frame spacing interval 356. Similarly, frame 352b is separated from the frame 352c by frame spacing interval 356a. The frame spacing interval 356 and the frame spacing interval 356a can be the same or different time durations.

In certain embodiments, the frame transmission interval 354 is shorter than the frame spacing interval 356. For example, the frame transmission interval 354 can be 0.2 seconds for each of the frames (such as frame N) and the frame spacing interval 356 can be 0.8 seconds. In this example, when processing two consecutive frames the effective radar frame increases to 1.2 seconds (the duration of two of the frames which have a transmission interval of 0.2 seconds each, and the frame spacing interval of 0.8 seconds), while the actual radar transmission remains the same. Similarly, when processing three consecutive frames the effective radar frame increases to 2.2 seconds (the duration of three of the frames which have a transmission interval of 0.2 seconds each, and two frame spacings intervals which are 0.8 seconds each), while the actual radar transmission remains the same.

In certain embodiments, one or more radar frames can be used to generate reliable detection of a human body part even when there is only minor and weak movement. As described above RF exposure levels are monitored for human body parts. As such, human body part can be distinguished from an inanimate object (such as a table) based on movements of the object itself. For example, if a single radar-frame does not detect a moving object, embodiments of the present disclosure describe using multiple radar frames to detect the moving object. Upon determining that the object moves, embodiments of the present disclosure describe identifying the angle of arrival of the object relative to the radar transmitter. The radar frames can include non-uniformly spaced radar pulses or uniformly spaced radar pulses.

For instance, if the radar measurements were conducted using multiple frames, where the transmission interval 354 of a frame is 0.2 second and the frame spacing interval 356 is 0.8 seconds, the more frames that are processed can increase the ability of the electronic device to identify motion of a detected object. For instance, using one frame to detect motion the detection rate can be 54.5%. When using two frames to detect motion the detection rate can increase to 97.6% and when using three frames to detect motion the detection rate can increase to 100%. As such, the more frames that are used, where each frame is separated by a frame spacing interval 356, increases the likelihood that movement is detected, where the movement indicates that a detected object is a human body part instead of an inanimate object. It is noted that if the detected object is an inanimate object, the electronic device may not reduce the transmit power since there is no concern for RF exposure to the inanimate object. In contrast, upon determining that the object moves, then electronic device may reduce the transmit power since there is a concern for RF exposure.

FIGS. 3D and 3E illustrates example pulse structures 360 and 370 according to embodiments of this disclosure. The pulse structure 360 of FIG. 3D has a number of pulses, such as pulse 1 through pulse 5, which are separated by a pulse spacing 364. A pulse interval 362 is the length of the transmission of a pulse and a subsequent pulse spacings 364.

The pulse structure 360 of FIG. 3D illustrates a special case of a frame structure. The pulse structure 360 illustrates the frame spacing as being the same as the pulse spacing 364. In this embodiment, there is no actual physical boundaries between the frames. This timing structure allows sliding window processing where the stride (how often to do the processing) could be selected accordingly. An illustrative example for sliding window 366 and 368 of three pulses with a stride of two is shown in FIG. 3D.

The pulse structure 370 of FIG. 3E illustrates a special case where the sampling of the pulses may not be uniform. For example, pulse 372a is separated from pulse 372b by pulse spacing 374. Similarly, pulse 372b is separated from pulse 372c by pulse spacing 376. The pulse spacing 374 and the pulse spacing 376 can be the same or different time durations.

Using variable spacing between pulses and/or frames can increase flexibility and provide coexistence with other systems. For example, consider a 5G system setting, the radar may be constrained by the 5G scheduler on when the radar could operate. By allowing variable spacing, the radar can transmit whenever allowed or not impacting the 5G scheduled time. For another example, consider a WiFi-like system that implements a carrier sensing-based solution. In such a case, the availability of the medium is unknown a priori. The transmitter would have to first listen for transmission in the medium before it can transmit. This kind of uncertainty makes it difficult to guarantee uniform sampling of the pulses and/or frames.

Although FIGS. 3A-3E illustrate electronic device 300 and radar signals, various changes can be made to FIGS. 3A-3E. For example, different antenna configurations can be activated, different frame timing structures can be used or the like. FIGS. 3A-3E do not limit this disclosure to any particular radar system or apparatus.

Figure 4B:
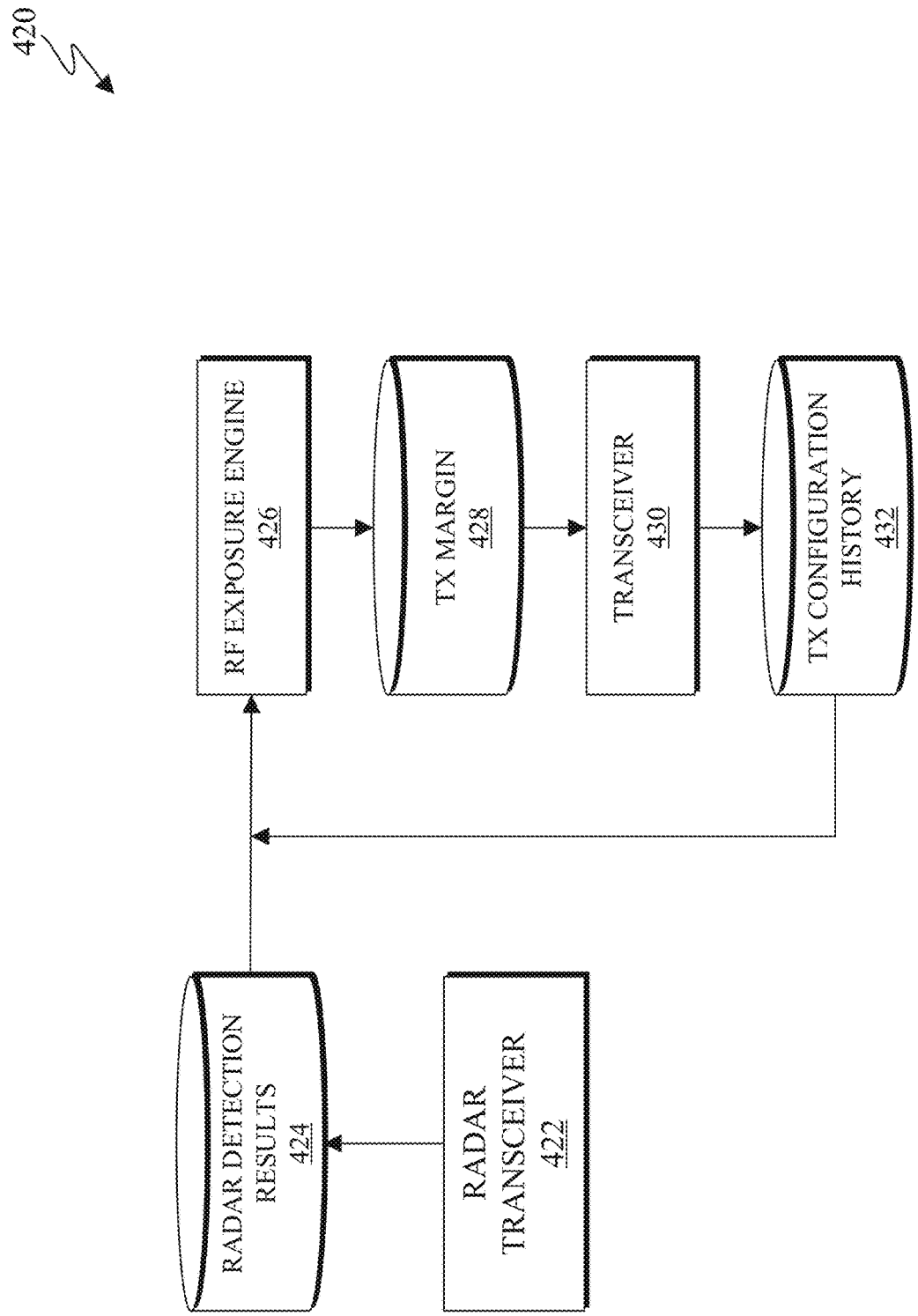
FIG. 4B illustrates a signal processing diagram for controlling radio frequency (RF) exposure according to embodiments of this disclosure.
Figure 4C:
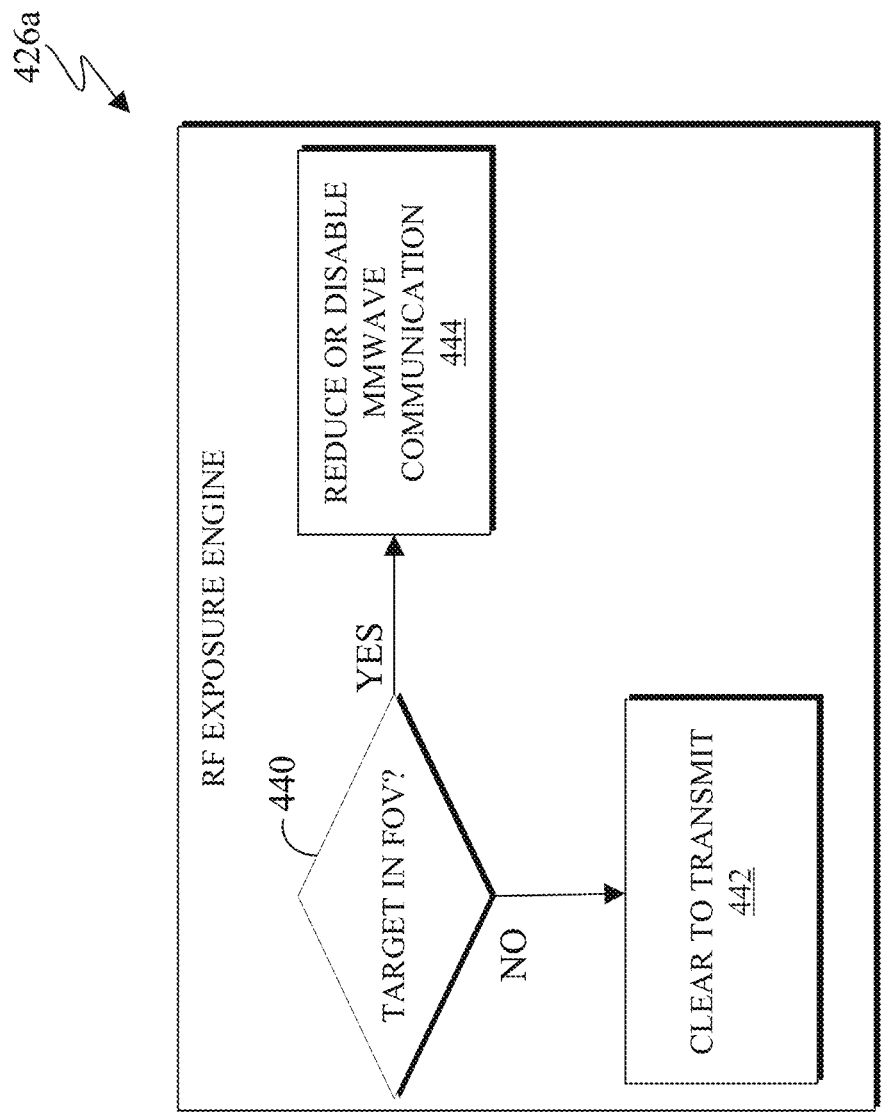
FIGS. 4C and 4D illustrate processes for RF level exposure modifications according to embodiments of this disclosure.
Figure 4D:
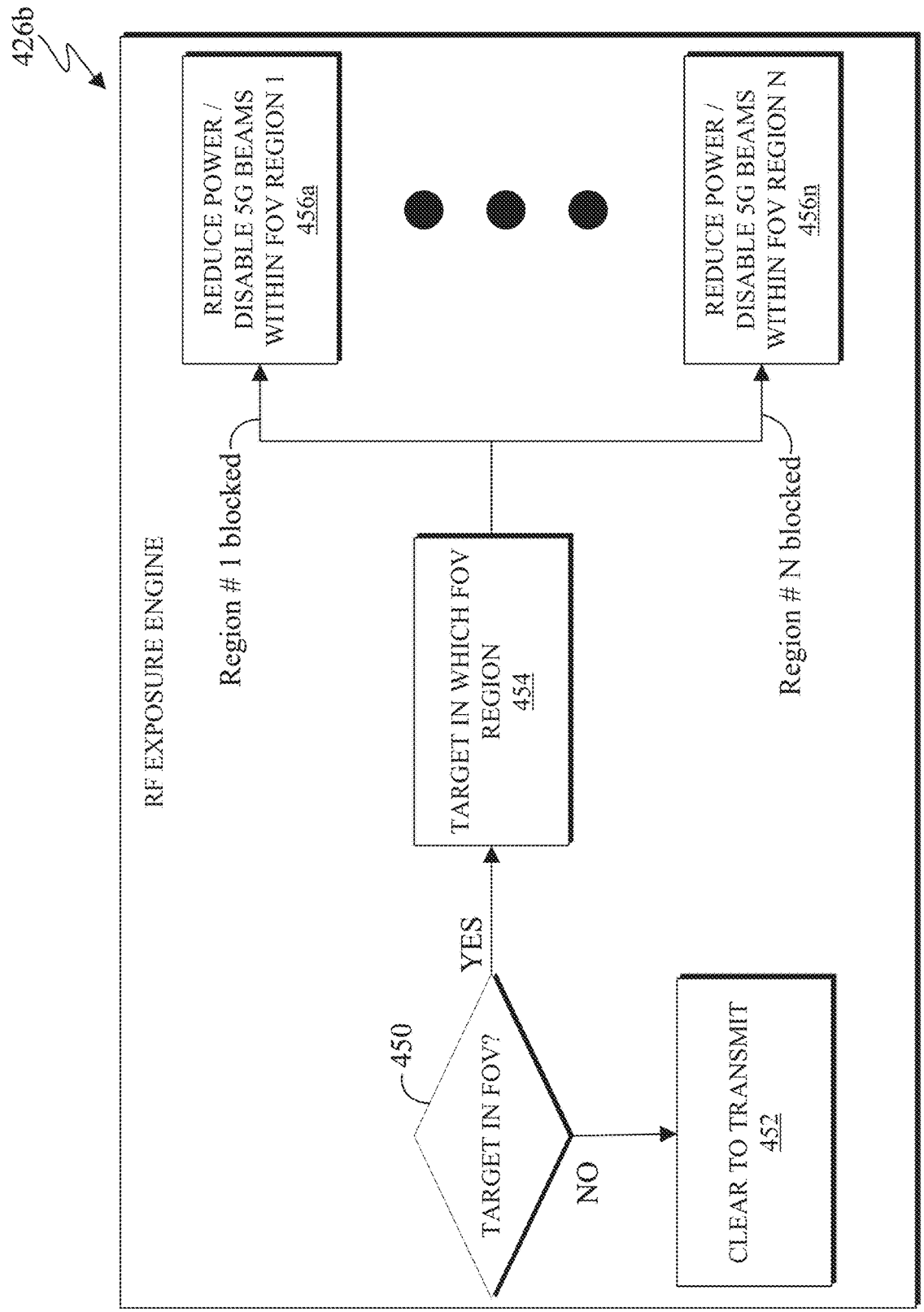

FIG. 4A illustrates a diagram 400 of an electronic device with multiple field of view regions corresponding to beams according to embodiments of this disclosure. FIG. 4B illustrates a signal processing diagram 420 for controlling radio frequency (RF) exposure according to embodiments of this disclosure. FIGS. 4C and 4D illustrate processes 426a and 426b, respectively, RF level exposure modifications according to embodiments of this disclosure. The embodiments of the diagram 400, the signal processing diagram 420, and the process 426a, are for illustration only. Other embodiments can be used without departing from the scope of the present disclosure.

The diagram 400, as shown in FIG. 4A illustrates an electronic device 410. The electronic device 410 can be similar to any of the client devices 106-114 of FIG. 1, the server 104 of FIG. 1, the electronic device 200 of FIG. 2, or the electronic device 300 of FIG. 3A.

The electronic device 410 can include one or more mmWave antenna modules or panels on. The electronic device 410 can transmit multiple beams corresponding to various regions such as region 415a, 415b, 415c, 415d, 415e, and 415f (collectively regions 415). Each beam has a width and a direction. To transmit the beams the electronic device 410 can include two or more mmWave antenna modules or panels such as an antenna. Other electronic devices can include less or more mmWave antenna modules or panels, such as a single mmWave antenna module or panel.

An RF exposure engine can maintain exposure compliance while minimizing the opportunity loss for communication beamforming operations. One way to achieve such RF exposure control is for the device to be able to know whether there is exposure risk (or whether there is no exposure risk) based on detecting whether there is a body part of a human nearby within one or more of the field-of-view (FoV) regions of the antennas or not.

The signal processing diagram 420 illustrates an example process for controlling RF exposure. The signal processing diagram 420 includes several information repositories, including a radar detection results 424, a transmission margin 428, and transmission configuration history 432. These information repositories can be similar to or included within the memory 260 of FIG. 2. The signal processing diagram 420 also includes a radar transceiver 422, which can be similar to the radar transceiver 270 of FIG. 2. The signal processing diagram 420 further includes transceiver 430 which can be similar to the transceiver 210 of FIG. 2.

The radar transceiver 422 transmits and receives radar signals. The received radar signals are used to detect objects which are stored in the radar detection results 424. The electronic device logs any detected results in the radar detection results 424. The transceiver 430 logs its adopted transmission configuration such as the transmit power, the beam index used, the duty cycle and the like to the TX configuration history 432. Based on (i) whether an object is detected (as indicated in the radar detection results 424) and (ii) previous RF exposure levels (as indicated in the TX configuration history 432) the RF exposure engine 426 estimate the worst case RF exposure and derive the transmission margin 428. The transmission margin 428 is a level of RF transmission that would not lead to RF exposure violation, which occurs when a user is exposed to RF above the margin.

It is noted that the update rate of the TX configuration and the radar detection may not be the same. For example, the update rate of the TX configuration could be almost instantaneous (or can practically assume so), while radar detection could be done sporadically due to the constraint on the radar transmission and/or the computational cost for running the radar detection procedure.

The RF exposure engine 426 can control RF exposure based on a module-level or a beam-level based on radar capability. For example, if the radar cannot detect angle (such as when the electronic device has a single antenna) or lacks enough resolution, the RF exposure engine 426 may operate the module-level RF exposure management, illustrated in FIG. 4C. If the radar has good range resolution and can estimate the angle of the object, the RF exposure engine 426 may operate using the beam-level RF exposure management, illustrated in FIG. 4D.

FIG. 4C illustrates the process 426a for the RF exposure engine 426 of FIG. 4B to derive the transmission margin 428 to prevent RF exposure over a predefined limit regarding a module-level RF exposure.

For module-level RF exposure management, the RF exposure engine 426, in step 440 determines, whether a target is within the FoV. The FoV can include multiple regions on one side of the electronic device 410, such as the regions 415a-415c. When the electronic device does not detect an object within the region 415a-415c (based on the results from the radar transmission), the RF exposure engine 426 in step 442 can notify the mmWave communication module, (such as the transceiver 210 of FIG. 2 or the transceiver 430 of FIG. 4B) that is it clear to transmit with no limitations. Alternatively, when the electronic device detects an object that is classified as a human body part (based on the results from the radar transmission and movement of the object), that is within the area defined by the region 415a-415c, then the RF exposure engine 426 in step 444 notifies the mmWave communication module, (such as the transceiver 210 of FIG. 2 or the transceiver 430 of FIG. 4B) so that mmWave communication module may reduce the transmit power, revert to using less directional beam, or abort the transmission altogether if the exposure risk is too eminent.

FIG. 4D illustrates the process 426b for the RF exposure engine 426 of FIG. 4B to derive the transmission margin 428 to prevent RF exposure over a predefined limit regarding a beam-level RF exposure.

For the beam-level RF exposure management, the FoV of the module-level RF is divided into smaller FoV regions (the granularity depends on the angle resolution of the radar and expected object (target) size), such as the region 415a. The operation is the same as the module-level operation, with the exception that here only when a target is detected within a particular FoV region, such as the region 415a that the RF exposure engine 426 would make adjustment for the affected beams belonging to that FoV region.

For example, the RF exposure engine 426, in step 450 determines whether a target is within the FoV. The FoV can correspond to different beams illustrated by the different regions 415. When the electronic device does not detect an object (or detects an object that is determined to not be a human body part), the RF exposure engine 426 in step 452 can notify the mmWave communication module, (such as the transceiver 210 of FIG. 2 or the transceiver 430 of FIG. 4B) that is it clear to transmit with no limitations. Alternatively, when the electronic device detects an object, that is classified as a human body part, the electronic device determines, in step 454, which region the object is within. Based on which of the one or more regions 415a-415f are blocked, the RF exposure engine 426 in step in step 456a-456n, notifies the mmWave communication module, (such as the transceiver 210 of FIG. 2 or the transceiver 430 of FIG. 4B) so that mmWave communication module may reduce the transmit power to the particular region, revert to using less directional beam in the particular region, or abort the transmission altogether if the exposure risk is too eminent. For example, if the hand of the user is detected in the region 415a and no object is detected in the regions 415b-415f, then the mmWave communication module may reduce the power or disable the 5G beams within the region 415a while maintaining a higher transmit power in the regions 415b-415f without risking any exposure concerns to the user.

Although FIGS. 4A-4D illustrates the electronic device 410, the signal processing diagram 420, and the processes 426a and 426b, various changes can be made to FIG. 4A-4D. For example, any number of antennas can be used to create any number of regions FIGS. 4A-4D does not limit this disclosure to any particular radar system or apparatus.

Figure 5A:
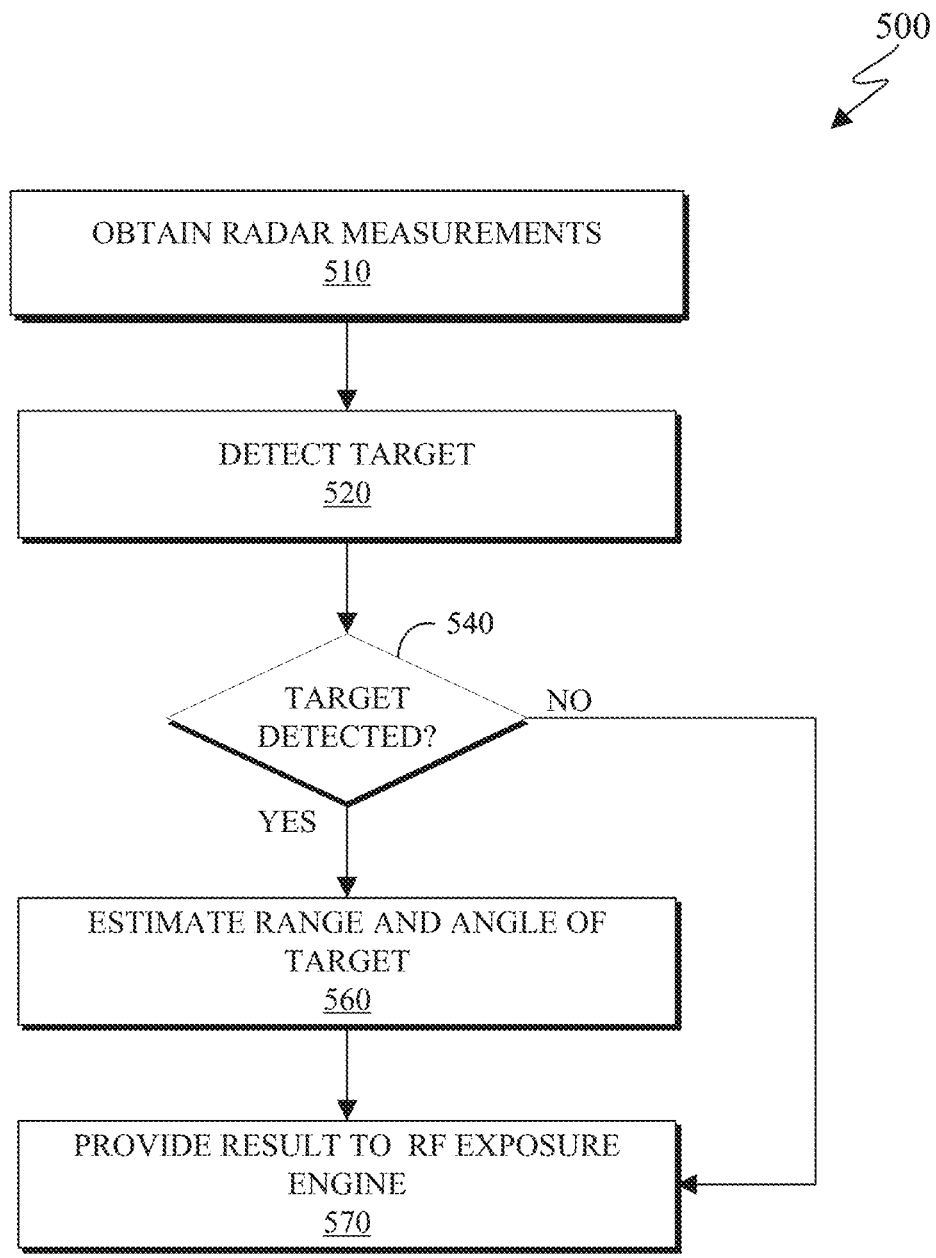
FIG. 5A illustrates a method for beam level exposure management based on object detection according to embodiments of this disclosure.
Figure 5B:
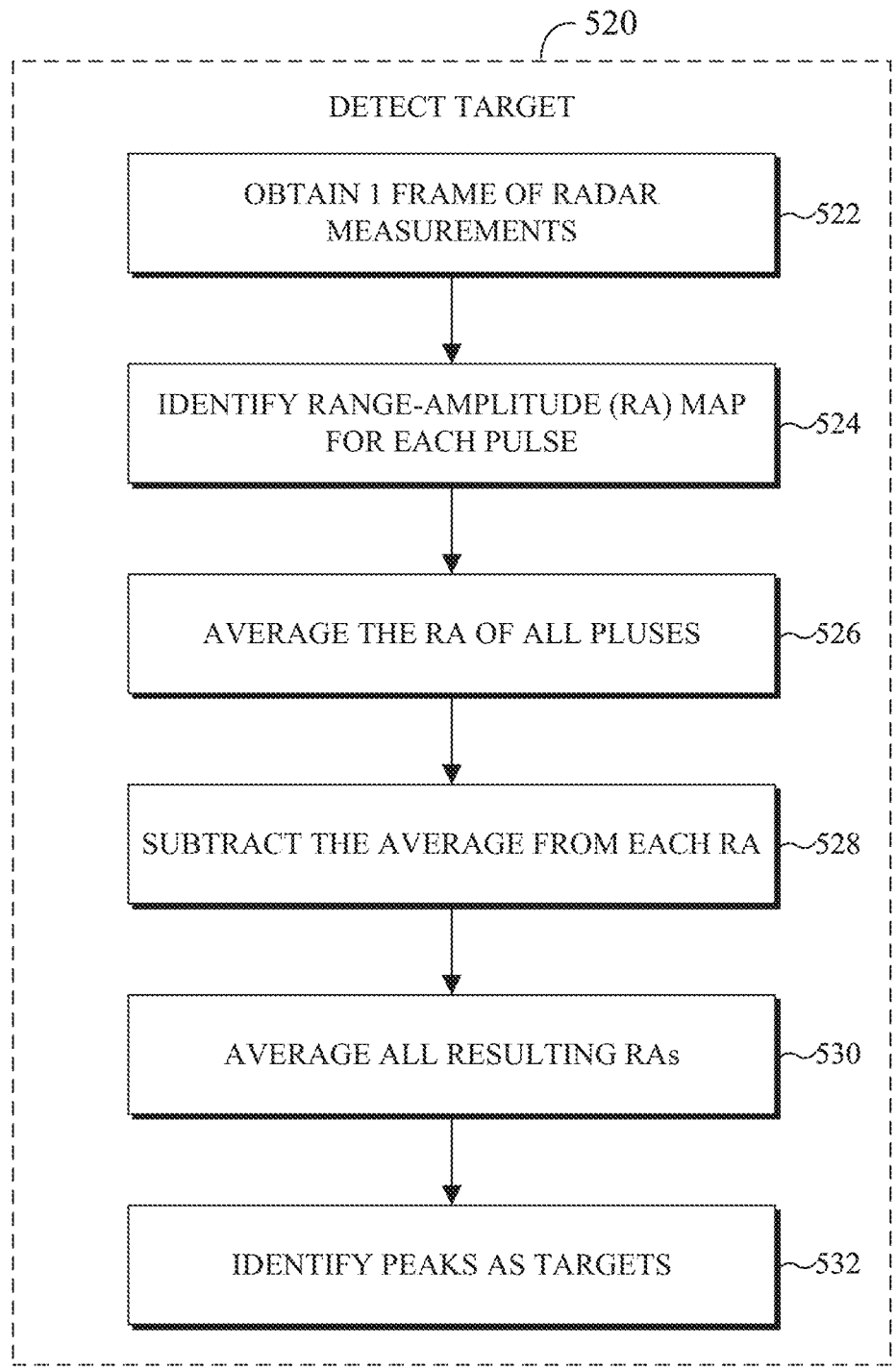
FIG. 5B illustrates a method for object detection according to embodiments of this disclosure; for object detection.
Figure 5C:
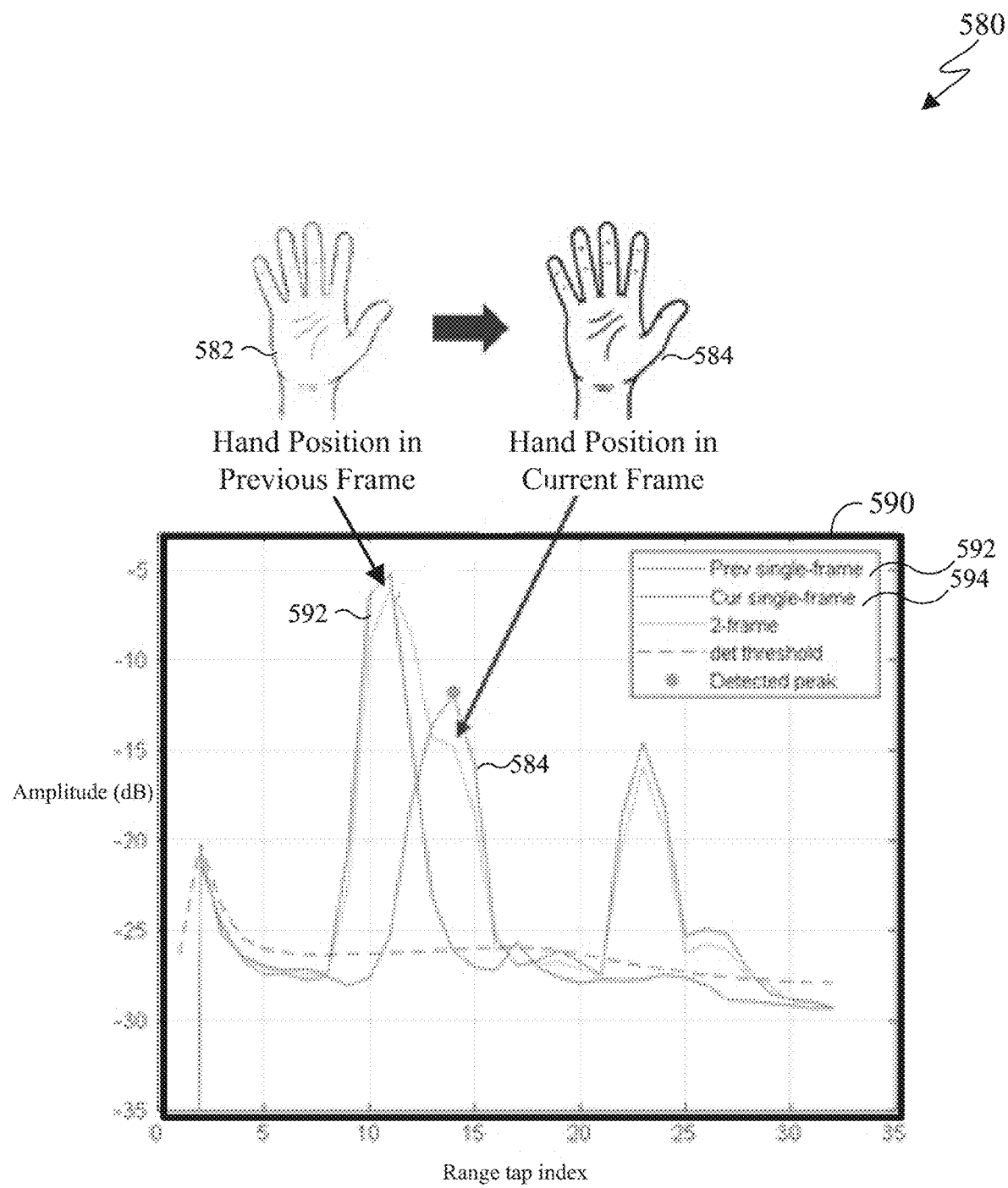
FIG. 5C illustrates a diagram of an example result of processing two frames for object detection when the object is moving fast according to embodiments of this disclosure.

FIG. 5A illustrates a method 500 for beam level exposure management based on object detection according to embodiments of this disclosure. FIG. 5B illustrates a method for object detection from step 520 of FIG. 5A according to embodiments of this disclosure; for object detection. FIG. 5C illustrates a diagram 580 of an example result of processing two frames for object detection when the object is moving fast according to embodiments of this disclosure. The method 500 is described as implemented by any one of the client device 106-114 of FIG. 1, the server 104 of FIG. 1, the electronic device 300 of FIG. 3A the electronic device 410 of FIG. 4A and can include internal components similar to that of electronic device 200 of FIG. 2. However, the method 500 as shown in FIG. 5A could be used with any other suitable electronic device and in any suitable system, such as when performed by the electronic device 200. For ease of explanation, FIGS. 5A, 5B, and 5C are described as being performed by the electronic device 200 of FIG. 2.

The embodiments of the method 500 of FIG. 5A, the method of FIG. 5B, and the diagram 580 of FIG. 5C are for illustration only. Other embodiments can be used without departing from the scope of the present disclosure.

The method 500 of FIG. 5A describes processing a single radar frame. The method 500 first determines whether there is an object such as a human body part within the FoV of the radar, and then determines the ranges and angles of each detected human body for adjusting the RF exposure level relative to the location of the detected human body part. The method 500 is described as being performed once per radar frame interval, however depending on the application requirements, system constraint, or the like, it could be desirable to select a different processing interval than the radar frame interval. For example, the processing could be performed once per N radar frames.

In step 510, the electronic device 200 obtains radar measurements. Radar measurements are obtained based on a radar transceiver (such as the radar transceiver 270 of FIG. 2) transmitting radar signals and receiving reflections of the radar signals. In certain embodiments, the radar measurements are obtained from an information repository (such as the memory 260 of FIG. 2) which stores previously derived radar measurements.

In step 520, electronic device 200 performs a radar detection to detect an object from the radar measurements. Step 520 is described in detail in FIG. 5B, below. In step 540, the electronic device 200 determines whether an object is detected. If no object is detected (or the detected object is not a human body part), then the electronic device 200 declares that no object is detected, which is provided to the RF exposure engine 426 of FIG. 4B (step 570).

Alternatively, if a human body part is detected (as determined in step 540), the electronic device 200 estimates the range and angle of the object (step 560). For example, if there is at least one object detected, the range and angle of each object is identified. All detected objects along with their attributes (ranges and angles) are provided to the RF exposure engine 426 of FIG. 4B (step 570). The RF exposure engine 426 can reduce the transmission power, duty cycle, or abort the transmission altogether for certain beams that correspond to the angle(s) of the detected objects. The RF exposure engine 426 can use other beam directions corresponding to regions where the object is not detected without exposure risk.

FIG. 5B describes the step 520 of FIG. 5A in greater detail. In particular, FIG. 5B describes target detection based on single-frame processing. Moreover, FIG. 5B describes detecting a moving object corresponding to a human body part.

In step 522, the electronic device 200 obtains measurements from one radar frame. The step 522 can obtain the radar measurements from step 510 of FIG. 5A.

In step 524, the electronic device 200 identifies a Range-Amplitude (RA) map for each pulse of the obtained radar frame. For example, the raw radar measurements are processed (pulse-compression or taking fast-Fourier transform (FFT) for Frequency Modulated Continuous Wave (FMCW) radar) to compute the Complex Impulse Response (CIR) also known as range FFT for FMCW radar, whose amplitude is the RA map. The RA map is a one dimensional signal that captures the amplitude of the reflected power from the reflectors in the FoV of the radar for a finite set of discrete range values (denoted as range tap or tap). This CIR is computed for each pulse separately.

In step 526, the electronic device 200 averages the CIRs from all the pulses within the radar frame to generate the zero-frequency (DC) component as measured by the current processed radar frame. The DC component is the estimate of the reflection from all static objects within the radar's FoV. These static reflections include the leakage (the direct transmission from the radar TX to the radar RX and other reflections off the parts of the radar equipped device) as well as other static objects (relative to the radar) not part of the device housing the radar. In step 528, the electronic device 200 removes (subtracts) the DC component from each pulse.

In step 530, the electronic device 200 averages all resulting RA's to identify the amplitude of each range tap and averaged across all the CIRs. The resulting output is called the range profile, which provide a measure of the amplitude of non-static objects within the radar's FoV for each range tap. In step 532, the electronic device 200 performs the object detection using the range profile by identifying the peaks of the range profile as targets. For example, the electronic device 200 detects the peaks in the range profile and compares the value at the peak with a detection threshold. The detection threshold can be set according to the noise floor at the particular range tap. For example, the threshold can be set to some number of times the power of the noise floor (such as 3 dB or twice the power of the noise floor). This threshold could be selected to balance misdetection and false alarm rate.

As described above, body parts of a live human can be expected to possess some movements at all times. The movement can be typical body movement (such as intentional hand movement such as grabbing or reaching for something or some unintentional ones such micro movement caused by the muscle reflexes, and the like). Some of the micro movements could be difficult to see visually because of the minor and weak nature of those movement. For radar the sensitivity of the detection of such movement depends on the observation time of the radar signals (which is the radar frame duration in our case). For example, the longer the frame duration is the more sensitive the radar is to the minor movement. Accordingly, the objects being detected as described in FIG. 5B are non-static objects in order to detect a body part of a human to avoid exposing the body part to RF exposure above a certain threshold.

Embodiments of the present disclosure describe using a processing frame that is long enough to provide a sensitivity level, such that body parts are detected with as low misdetection rate. Embodiments of the present disclosure take into consideration that by increasing the transmission interval 354 of FIG. 3C, can reduce the misdetection rate. However, increasing the transmission interval 354 is costly in that it increases the radar duty cycle to maintain the same (or similar) frame interval. Additionally, if the radar shares a wireless medium with other systems, a long frame transmission time may create a conflict between the radar and other wireless systems.

In certain embodiments, the processing frame duration can be increased by virtually allowing overlap between the processing frames. This allows for the transmission interval 354 of a frame to not increase. For example, as shown in FIG. 3C, two radar frames can be used within one processing frame interval (such as the processing intervals 358a and 358b) to increase the observation time of the radar signals used for the detection. With single frame processing, the observation of the radar signal within the processing frame is equal to the frame TX interval. In contrast, by processing two (or more) frames, the processing interval is increased for the duration of each transmission interval 354 of a frame and the frame spacing interval 356 between two frames. For example, by processing two radar frames, the observation times is described in Equation (11), below.

(frame TX interval)+(frame spacing)+(frame TX interval)=2×(frame TX interval)+(frame spacing). (11)

As described in Equation (11) and shown in the processing interval 358a of FIG. 3C, the processing duration is not just the transmission interval 345 of two frames (such as frames 352a and 352b), rather the processing duration is increased due to the silence period in the frame spacing (such as the frame spacing interval 356a). Additionally, depending on the detection frequency (one detection per second or the like) the frame spacing could be much larger than the frame TX interval. When the frame spacing is larger than the frame TX interval, the radar observation time for the detection increases without increasing the radar duty cycle.

The electronic device 200 can determine whether to use a single frame or multiple frames (two or more frames) in a processing interval for detecting movement of the object in order to determine whether to modifying the RF exposure level in area(s) corresponding to the detected object. FIGS. 6-12 describe various processes for determining whether to use a single frame or multiple frames (two or more frames).

For estimating the angle of the object, first a (spatial) covariance matrix of the object (target) has to be estimated. One way to estimate the covariance matrix is by computing the sample average of the CIR after subtracting the average (0-Doppler removal) at the detected tap index. Equation (12) below defines $X_p$ as the vector of CIR of the p-th pulse at the target tap after the average subtraction of all the radar RX antennas.

$$X_p = [X_p^1, X_p^2, \ldots, X_p^R]^T \quad (12)$$

Here, the radar has R receive antennas, and $X_p^r$ is the CIR after the average subtraction of the p-pulse received at the r RX antenna. It is noted that in this notation $X_p$ is a column vector of dimension R. P is the number of CIRs (or pulses) of the radar frame, and H is the conjugate transpose operator, then the covariance matrix can be estimated as described in Equation (13), below.

$$R_{xx} = \frac{1}{p} \sum_{p=1}^{P} X_p X_p^H \quad (13)$$

The difference between the single-frame and the multi-frame processing for the angle estimation is in the number of pulses P used for estimation of $R_{xx}$. Note that since the radar transmission timing structure is fixed (the same pulse and frame intervals), using a larger P also means $R_{xx}$ is averaged over a longer time duration. With this covariance matrix, various angle estimation methods can be used. Some examples include the Bartlett beamforming, the Capon's beamforming (also known as Minimum Variance Distortionless Response MVDR), MUltiple SIgnal Classification (MUSIC), and the like. These methods are what is called the spectrum-based solutions, where the angular spectrum $P(\theta)$ is computed and the peaks in $P(\theta)$ are the targets and the angles $\theta$ corresponding to those peaks are their respective angle estimates. Let $\alpha(\theta)$ be the steering vector of the array (normalized), then the angular spectrum for the Bartlett beamforming is described in Equation (14), below. Capon's beamforming is described in Equation (15), below. For MUSIC, beamforming is described in Equations (16) and 17, below.

$$P(\theta) = a(\theta)^H R_{xx} a(\theta) \quad (14)$$

$$P(\theta) = \frac{1}{a(\theta)^H R_{xx}^{-1} a(\theta)} \quad (15)$$

$$R_{xx} = U_s \Lambda_s U_s^H + \sigma^2 U_n U_n^H \quad (16)$$

$$P(\theta) = \frac{1}{a(\theta)^H (U_n U_n^H) a(\theta)}, \quad (17)$$

Here, in Equations (16) and (17) $U_s$ and $U_n$ are the signal and the noise subspace of $R_{xx}$, and $\Lambda_s$ (diagonal matrix with eigen values) and $\sigma^2$ (a scalar) are their corresponding eigen values. These can be obtained by performing eigen decomposition of $R_{xx}$.

In certain embodiments, the electronic device 200 determines whether to use a single frame (a current frame) or multi frame (the current frame and one or more additional previous frames) for estimating the covariance matrix. There are two considerations in selecting the frame duration (either to use single frame or to use two frames) to estimate the covariance matrix. The first consideration favors the use of single-frame. The covariance matrix estimate as described above assumes the location change of the object to be small (stay within the same range tap) during the estimation of the covariance matrix. This assumption can be broken when using multi-frame processing, and thus the shorter one like the single-frame is preferred. The second reasoning favors the use of the two frames. When the object's response is weak, the estimation of the covariance matrix will suffer from low SNR and thus longer averaging would help. In our case, the amplitude of the signal is the one after the 0-Doppler removal, and thus the low amplitude likely means that object has little movement and thus the smearing effect due to averaging over longer duration is not of concern.

For object angle estimation, the covariance matrix is first estimated where this covariance matrix is obtained by sample-averaged from the pulses within the radar frame. The typical assumption is that the movement of the object during the frame is negligible that it will not affect the estimation of the covariance matrix. However, with multi-frame processing this is no longer true. An illustrative example of this issue is shown in the diagram 580 of FIG. 5C. In this example, the target (the hand) is moving away from the device during the measurements. For example, at the first time measurement the hand is at position 582, and at the second time measurement the hand moved to position 584. Here, the radar frame interval can be about one second with active transmission time of around 0.2 seconds. The graph 590 describes how using a single frame (the current frame) or multiple frames (the current frame and one or more previous frames) can provide incorrect position of the hand when the hand is moving. Here, in the one second between the first radar frame and the second radar frame, the hand can move several centimeters causing the detected radar peak to fall into a different range tap index (tap 14 as shown in FIG. 5D), denoted by line 594. In this particular example, if the two frames are used to estimate covariance matrix, it would detect the angle of the target at tap 11 (line 592), which is not an actual target but a past image of the hand. In this case, using the current frame (of duration of 0.2 seconds) would provide the correct angle estimation and using multi-frame would provide an incorrect angle estimation.

Although FIGS. 5A and 5B illustrates one example for detecting a moving object and estimating its location various changes may be made to FIGS. 5A and 5B. For example, while shown as a series of steps, various steps in FIG. 5A, FIG. 5B, or both could overlap, occur in parallel, or occur any number of times.

Figure 6:
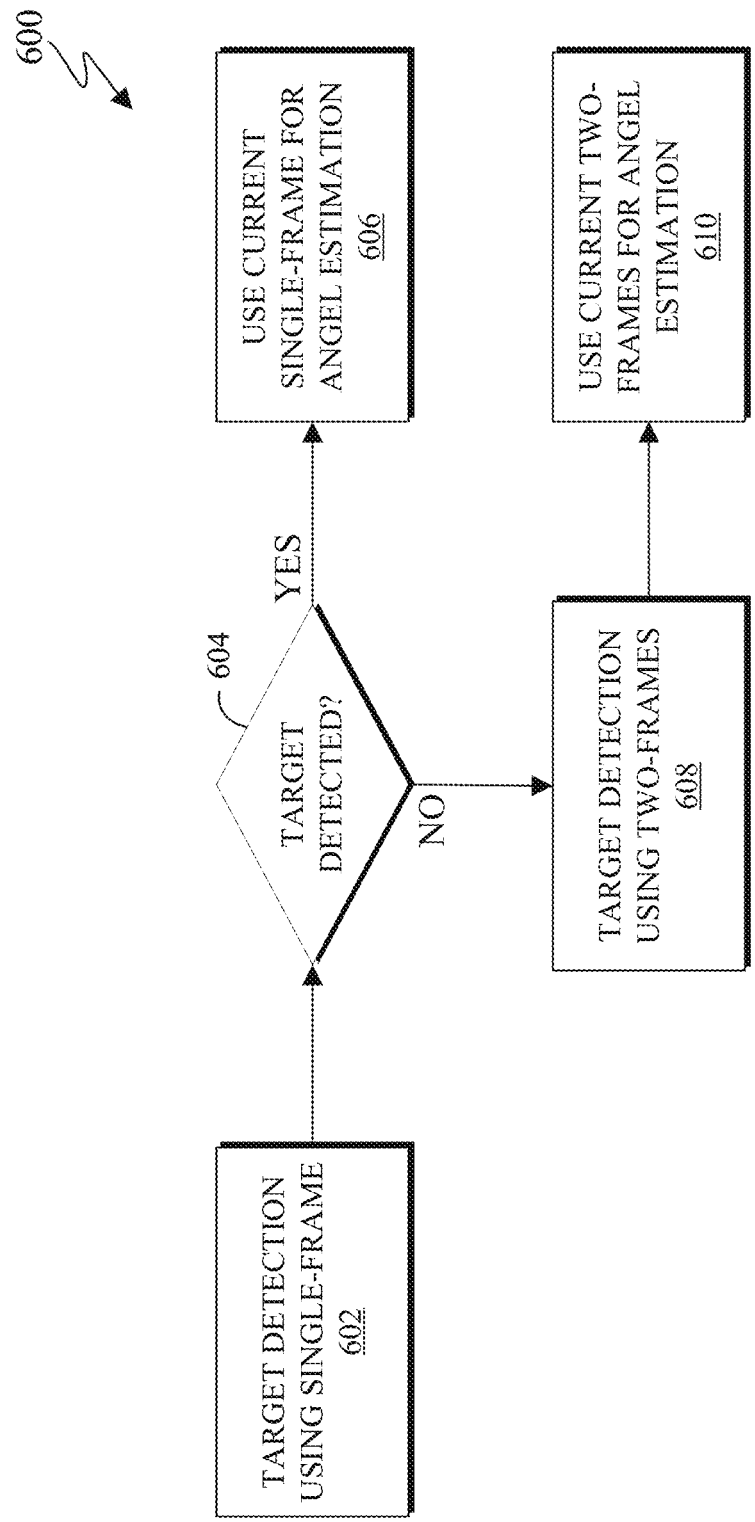
FIGS. 6-12 illustrate example methods for determining a number of frames for angle estimation according to embodiments of this disclosure.
Figure 7:
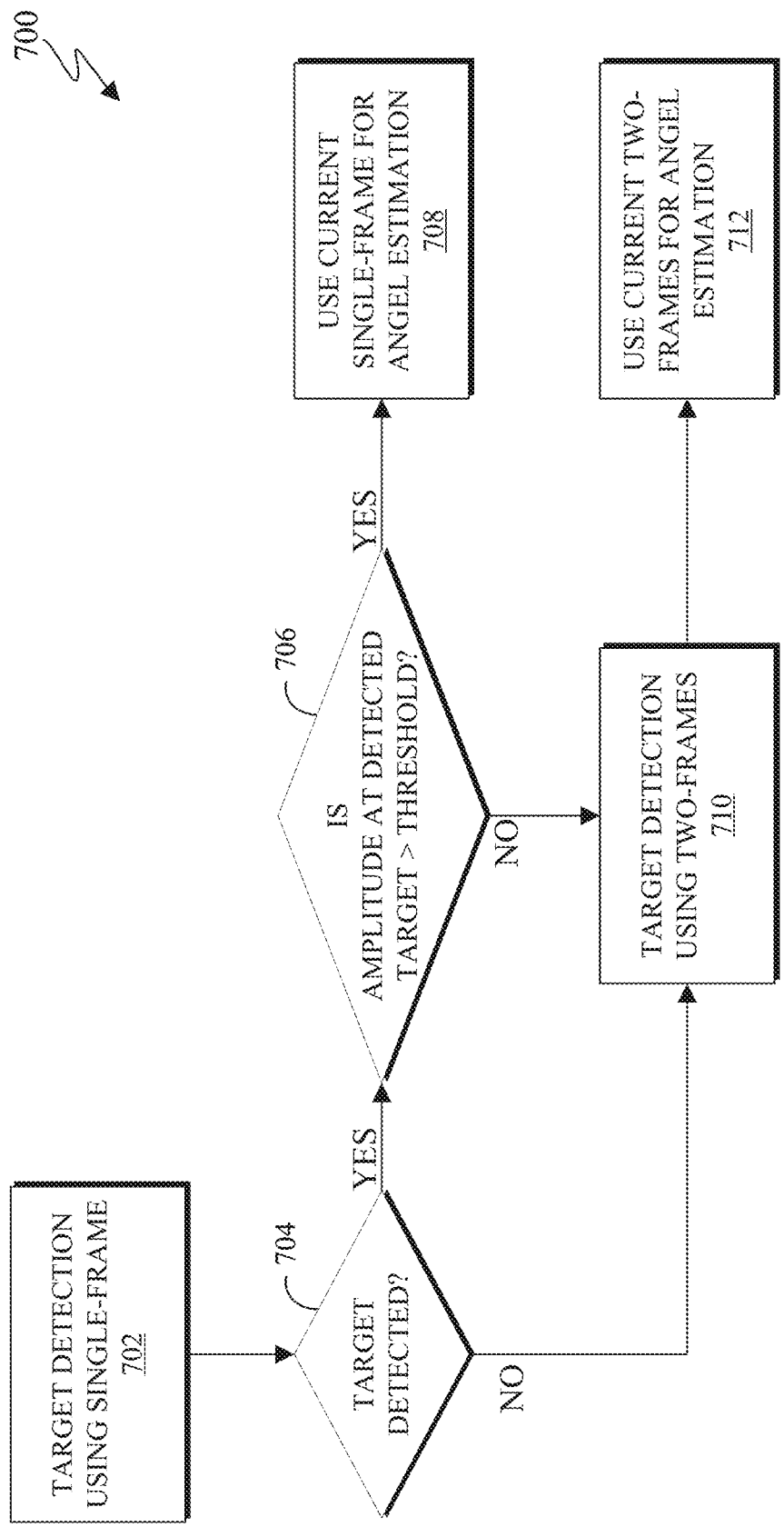
Figure 8:
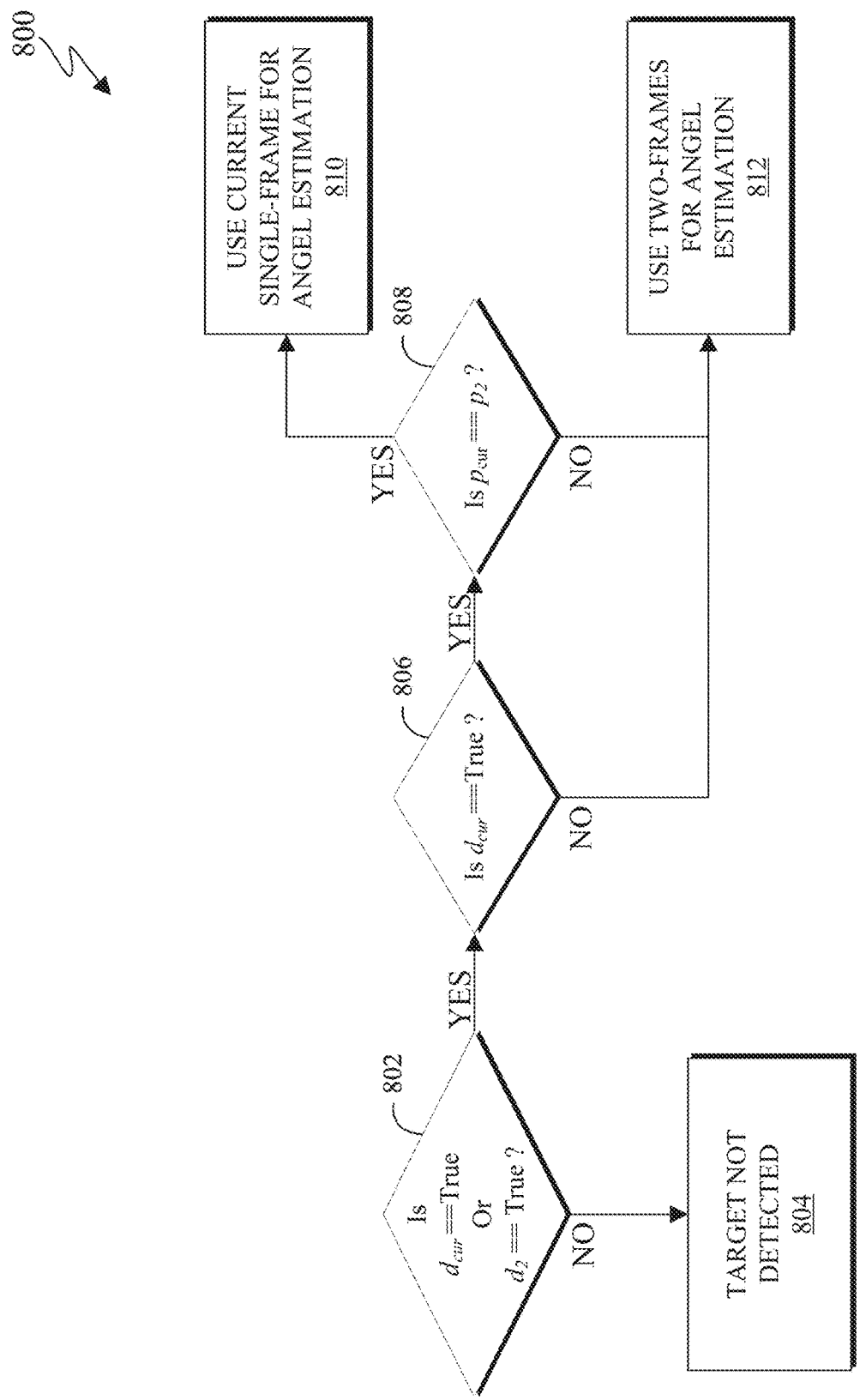
Figure 9:
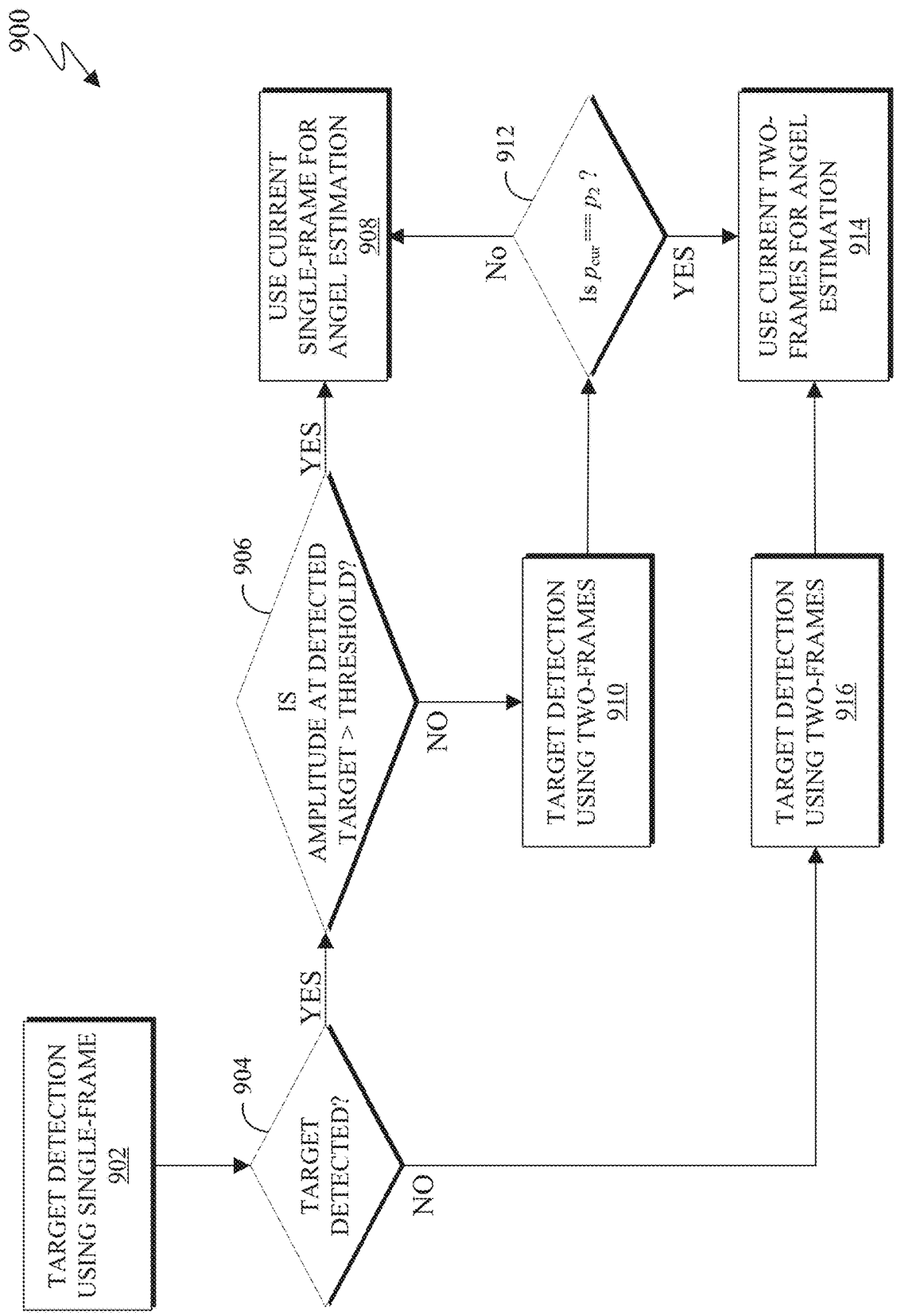
Figure 10:
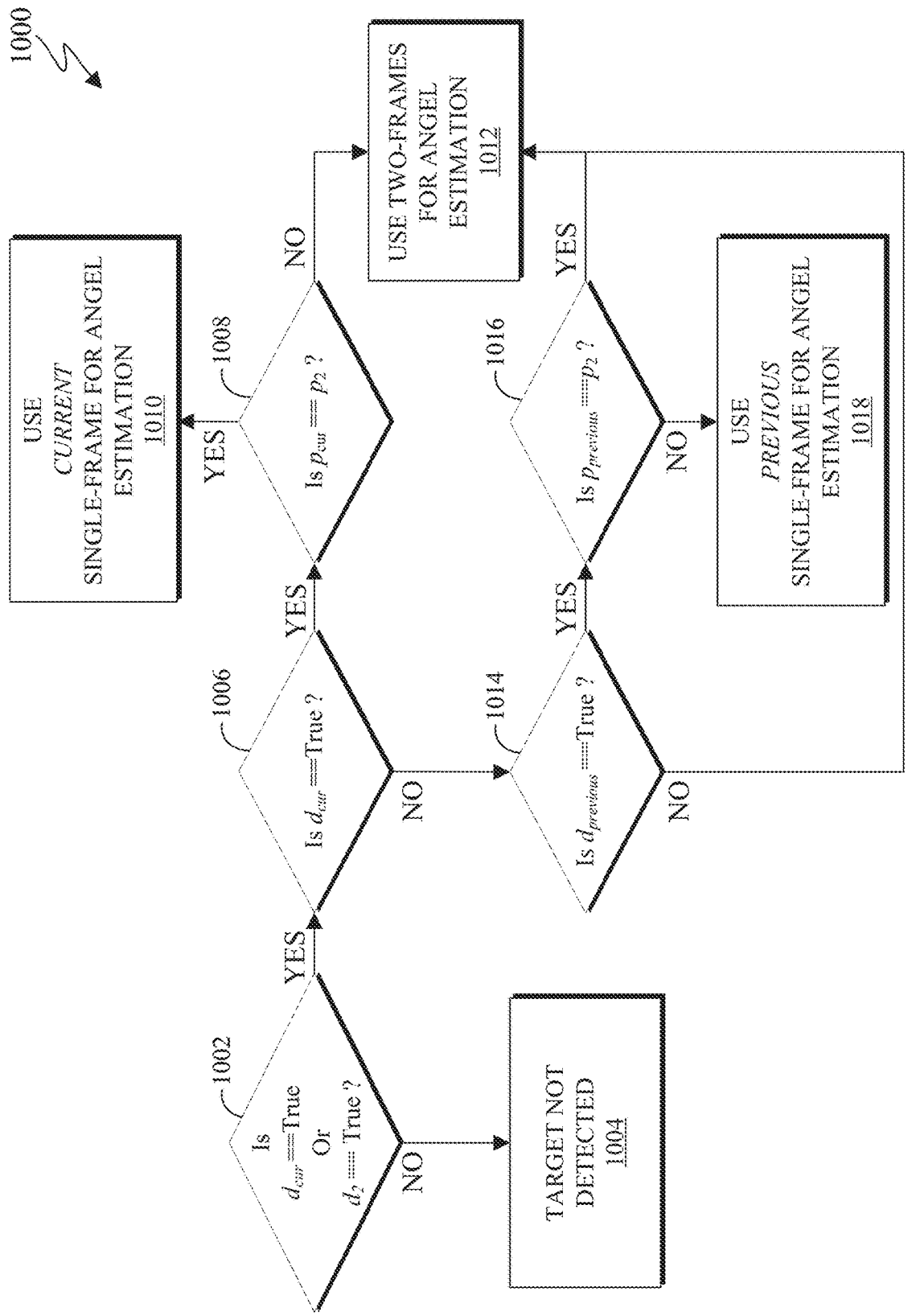
Figure 11:
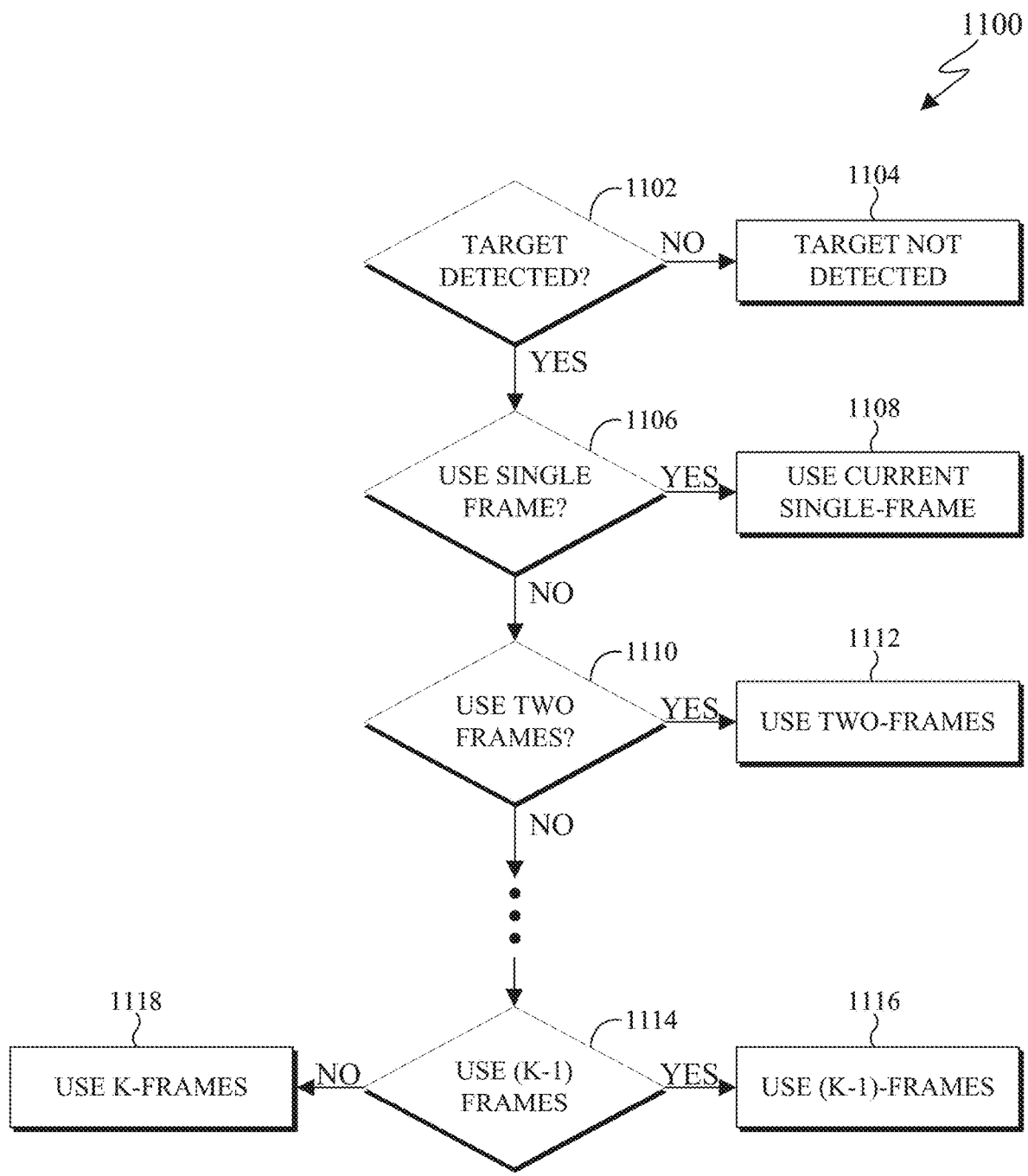
Figure 12:
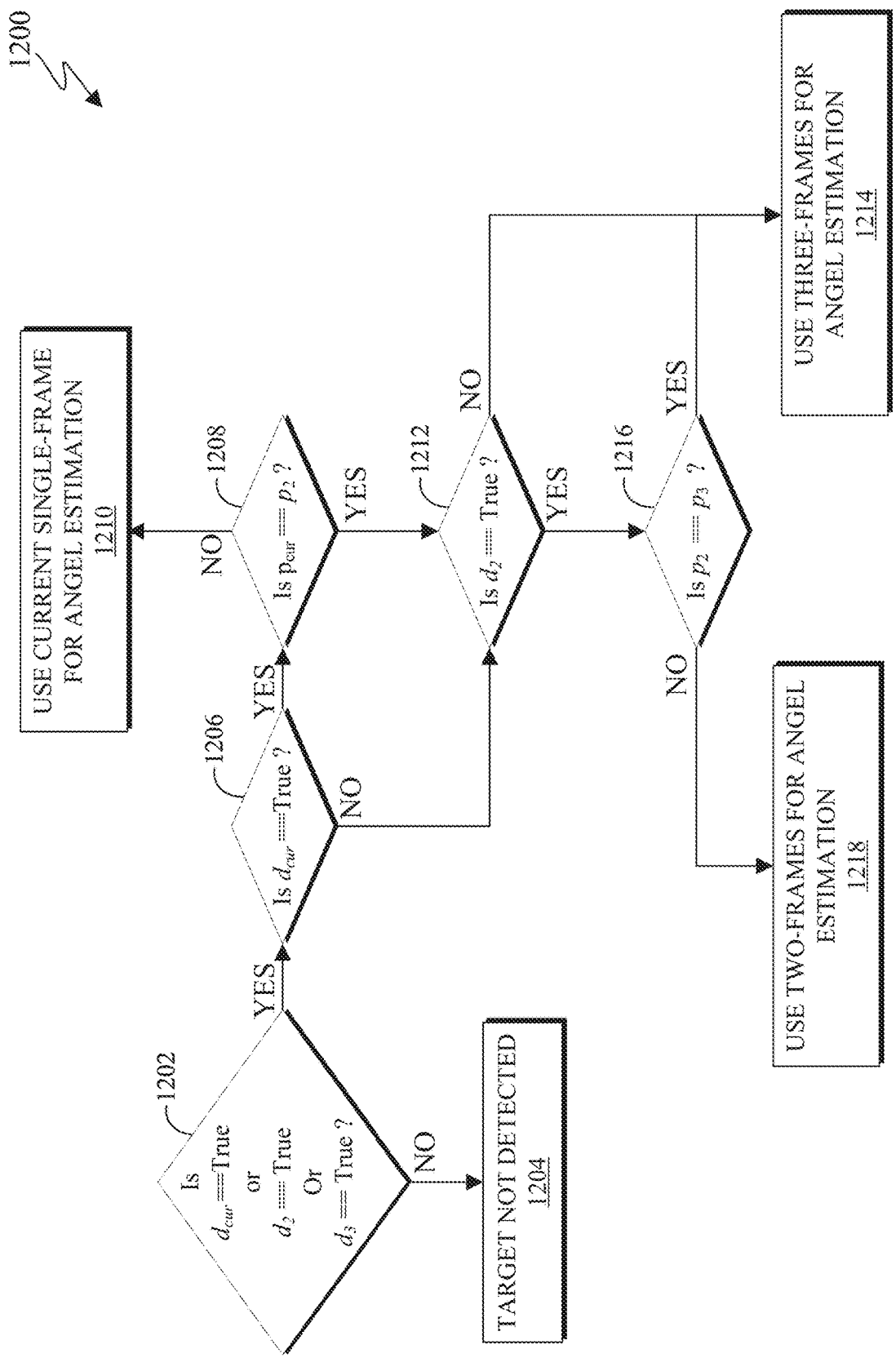

FIGS. 6-12 illustrate example methods for determining a number of frames for angle estimation according to embodiments of this disclosure. In particular, FIG. 6 illustrates a method 600 for determining a number of frames for angle estimation based on a detection status. FIG. 7 illustrates a method 700 for determining a number of frames for angle estimation based on a detection status and an amplitude of the detected target. FIG. 8 illustrates a method 800 for determining a number of frames for angle estimation based on a detection status and a detected target tap index. FIG. 9 illustrates a method 900 for determining a number of frames for angle estimation based on a detection status, a detected target tap index, and an amplitude of the detected target. FIG. 10 illustrates a method 1000 for determining a number of frames for angle estimation based on a detection status and a detected target tap index. FIG. 11 illustrates a method 1100 for determining a number of frames for angle estimation using more than two frames. FIG. 12 illustrates a method 1200 for determining a number of frames for angle estimation using three frames. The embodiments of the method 600 of FIG. 6, the method 700 of FIG. 7, the method 800 of FIG. 8, the method 900 of FIG. 9, the method 1000 of FIG. 10, the method 1100 of FIG. 11, and the method 1200 of FIG. 12 are for illustration only. Other embodiments can be used without departing from the scope of the present disclosure.

The methods 600, 700, 800, 900, 1000, 1100, and 1200 are described as implemented by any one of the client device 106-114 of FIG. 1, the server 104 of FIG. 1, the electronic device 300 of FIG. 3A the electronic device 410 of FIG. 4A and can include internal components similar to that of electronic device 200 of FIG. 2. For ease of explanation, methods 600 through 1200 are described as being performed by the electronic device 200 of FIG. 2.

The method 600 of FIG. 6 describes a process for determining whether to use a single frame or two frames for angle estimation based on detection status. For example, if the object is detected by the current single frame (such as when the current frame, denoted as $d_{cur}$, is true), then the single radar frame is used for covariance matrix estimation. Otherwise, if the two frames detects the object (such as the current frame and a previous frame), then the two frames are used for angle estimation. Note that in this case, when the object is detected by the single-frame processing, then the two-frame processing is skipped, reducing some computation cost.

In step 602, the electronic device 200 performs object detection using a single radar frame. The single frame is a current frame representing the environment around the electronic device 200 at a current time instance. In step 604, the electronic device 200 determines whether an object is detected from the single frame. If the electronic device 200 determines that an object is detected, then in step 606, the electronic device 200 uses the current frame for angle estimation. Alternatively, if the electronic device 200 determines that an object is not detected, then in step 608, the electronic device 200 performs target detection using two frames. The two frames include the current frame and a previous frame. The previous frame can be the frame that immediately came before the current frame. If an object is detected using the two frames, the electronic device 200, in step 610, uses the two frames for angle estimation. It is noted that if no object is detected in step 608, the electronic device 200 can notify the RF exposure engine 426 of FIG. 4B (such as described above in step 570 of FIG. 5A) that no objects are detected indicating that there is no need to mitigate the RF exposure level.

In certain embodiments, if the object is detected (using either the current frame or multiple frames), indicates that the peak has strong enough SNR such that an accurate angle between the electronic device and the location of the object can be identified.

The method 700 of FIG. 7 describes a process for determining whether to use a single frame or two frames for angle estimation based on the detection status and the amplitude of the detected target. The amplitude level corresponds to an amount of movement of a detected object. Therefore, if a single frame has a large amplitude, it indicates that the single frame is preferred for angle estimation to avoid a smearing effect. Alternatively, if the single frame has a small amplitude, it indicates that movement is small or non-existent and therefore two frames should be used to detect whether the object moves.

It is noted that the method 700 modifies the method 600 of FIG. 6 to include the amplitude of the detected object when the object is detected using a single (current) frame. For example, when the object is detected by the current single frame, the amplitude is checked to see if it is strong enough (the threshold for this could be the detection threshold plus some positive offset). If the detected object has strong signal, the single-frame is used, otherwise two frames are used. The reason is that if the detected peak by the single frame is strong, it means that it corresponds to a fast movement, and thus it can be expected that the covariance matrix estimated over a shorter duration has more fidelity and thus the single-frame is preferred. On the contrary, if the detected object is weak, there likely is little movement and thus the two-frame processing could be used to boost the SNR of the covariance matrix estimate.

In step 702, the electronic device 200 performs target detection using a single frame. The single frame is a current frame representing the environment around the electronic device 200 at a current time instance. In step 704, the electronic device 200 determines whether an object is detected from the single frame. If the electronic device 200 determines that an object is detected, then in step 706, the electronic device 200 compares the amplitude of the detected object to a threshold. If the amplitude of the detected object is greater than the threshold, the electronic device 200 uses the current frame for angle estimation (step 708).

Alternatively, if the electronic device 200 determines that (i) an object is not detected (in step 704) or (ii) the amplitude of the detected object is less than or equal to the threshold (in step 706), then in step 710, the electronic device 200 performs target detection using two frames. The two frames include the current frame and a previous frame. The previous frame can be the frame that immediately came before the current frame. If an object is detected using the two frames, the electronic device, in step 712, uses the two frames for angle estimation. It is noted that if no object is detected in step 710, the electronic device 200 can notify the RF exposure engine 426 of FIG. 4B (such as described above in step 570 of FIG. 5A) that no objects are detected indicating that there is no need to mitigate the RF exposure levels.

The method 800 of FIG. 8 describes a process for determining whether to use a single frame or two frames for angle estimation based on detection status and detected target tap index. Instead of the amplitude (as described in FIG. 7 above), another option is to use the detected tap index for determining whether to use a single frame (a current frame)

or two frames. Here, if an object is detected by single-frame (current frame) processing, then the electronic device 200 also determines whether the detected peak is the same for both single-frame and two-frame processing. If detected peak is the same for both single-frame and two-frame processing, then two frame would be used for angle estimation. If they are not, the single-frame process is used instead. Note that when they are not, it could be that there was some movement large enough to cause the object to change in the peak location and thus it is best to use a shorter frame for accurate angle estimation.

As used in FIG. 8, the expression $d_{cur}$ and $d_2$ are the detection status of particular frames, which can be a true (indicating that the single (current) frame $d_{cur}$ or the two frames detect the object) or false (indicating that the single (current) frame $d_{cur}$ or the two frames do not detect the object). Additionally, the expression $p_{cur}$ is the tap index of the detected object of the single (current) frame and $p_2$ is the tap index of the detected object of from the two frames.

In step 802, the electronic device 200 determines whether the object is detected using the single (current) frame or two frames (the current frame and frame that preceded the current frame). If the object is not detected in either of the single frame or the two frames, then the electronic device 200, in step 804, determines that no object is detected. The electronic device 200 can notify the RF exposure engine 426 of FIG. 4B (such as described above in step 570 of FIG. 5A) that no objects are detected indicating that there is no need to mitigate the RF exposure levels.

Alternatively, if the electronic device 200 determines that an object is detected in either of the single (current) frame or two frames, then in step 806, the electronic device 200 determines whether an object is detected from the single frame (when $d_{cur}$ is true). If the electronic device 200 determines that an object is detected from the single frame, then in step 808, the electronic device 200 determines whether detected peak is the same for both single-frame and two-frame processing. If detected peak is not the same for both single-frame and two-frame processing, then the electronic device 200 uses the current frame for angle estimation (step 810). If (i) the object is not detected in the current frame (as determined in step 806, such as when the object is detected using both the current frame and its previous frame) or (ii) the detected peak is the same for both single-frame and two-frame processing (as determined in step 808), then the electronic device 200, in step 812, uses the two frames for angle estimation.

The method 900 of FIG. 9 describes a process for determining whether to use a single frame or two frames for angle estimation based on the detection status, the amplitude of the detected object, and the detected object tap index. It is noted that the method 900 combines various aspects of the method 600 of FIG. 6, the method 700 of FIG. 7, and the method 800 of FIG. 8.

In this example, the amplitude of the object detected using the current single-frame processing. If the amplitude is strong enough, then the SNR is not an issue so that averaging over the shorter single-frame processing should be sufficient and can save some processing power. In this case, the current single-frame is used for angle estimation and there is no need to perform the two-frame processing (both for target detection and for angle estimation). If there is no object detected in the current frame or if the amplitude of the detected object is not strong enough by the single-frame processing, then two-frame target detection is conducted. For the case when the single-frame detects an object, the peak index detected by the single-frame and the two-frame are compared. If they match, the two frames are used for angle estimation, otherwise the single-frame is used for angle estimation. If the single-frame does not detect an object, then the two-frame object detection is performed, and if an object is detected, then the two frames are used for angle estimation.

In step 902, the electronic device 200 performs target detection using a single (the current) frame. In step 904, the electronic device 200 determines whether an object is detected from the single (current) frame. If the electronic device 200 determines that an object is detected using the current frame, then in step 906, the electronic device 200 compares the amplitude of the detected object to a threshold. If the amplitude of the detected object is greater than the threshold, the electronic device 200 uses the current frame for angle estimation (step 908).

If the electronic device 200 determines that an object is not detected in the current frame (as determined in step 904), then in step 916 the electronic device 200 performs target detection using two frames. The two frames include the current frame and a previous frame. The previous frame can be the frame that immediately came before the current frame. If an object is detected using the two frames, the electronic device, in step 914, uses the two frames for angle estimation.

If the electronic device 200 determines that the amplitude of the detected object is less than or equal to the threshold (as determined in step 906), then in step 910, the electronic device 200 performs target detection using two frames (similar to the step 916). The two frames include the current frame and a previous frame. The previous frame can be the frame that immediately came before the current frame. Upon detecting the object in step 910, the electronic device 200 determines, in step 912, determines whether detected peak is the same for both single-frame and two-frame processing. If detected peak is not the same for both single-frame and two-frame processing, then the electronic device 200 uses the current frame for angle estimation (step 908). Alternatively, if the detected peak is the same for both single-frame and two-frame processing (as determined in 912), then the electronic device 200, in step 914, uses the two frames for angle estimation.

It is noted that if no object is detected in step 910 or step 916, the electronic device 200 can notify the RF exposure engine 426 of FIG. 4B (such as described above in step 570 of FIG. 5A) that no objects are detected indicating that there is no need to mitigate the RF exposure levels.

The method 1000 of FIG. 10 describes a process for determining whether to use a current single frame, a previous single frame, or both the current and previous frames for angle estimation based on detection status and detected target tap index. It is noted that the method 1000 considers the current single-frame and the two-frame of the current processing frame, but also the previous single-frame (the first part of the two-frame).

As used in FIG. 10, the expression $d_{cur}$ is the detection status of a current frame, $p_{prev}$ is the detection status of a previous frame, and $d_2$ is the detection status of both the current and previous frame. Additionally, the expression $p_{cur}$ is the tap index of the detected object of the current frame, $p_{prev}$ is the tap index of the detected object of the previous frame, and $p_2$ is the is the tap index of the both the current and previous frames. The previous frame can be the frame that immediately came before the current frame.

For example, when the current single-frame can detect the object (such as when $d_{cur}$ is true), the steps are the same as the embodiment described FIG. 8. The difference is when $d_{cur}$ is false. In this case, the electronic device 200 checks the previous single-frame and follow a similar process as for the current single frame. The rationale for this is that if the object is not detected by the current single-frame, it is likely that there is not much movement. Therefore, using the previous single-frame is better because using the two-frames would likely just be an average over the noise for those pulses corresponding to the current single-frame which could harm the SNR. It is noted that for the case of estimating using the previous single-frame, the electronic device 200 could just output the angle estimated in the previous processing frame and there is no need to redo the estimation. Further extension by using the amplitude instead of the target tap index or using both amplitude and the target tap index could be done similarly as in the embodiments described above.

In step 1002, the electronic device 200 determines whether the object is detected using the current frame or two frames (the current frame and frame that preceded the current frame). If the object is not detected in either of the current frame or the two frames, then the electronic device 200, in step 1004, determines that no object is detected. The electronic device 200 can notify the RF exposure engine 426 of FIG. 4B (such as described above in step 570 of FIG. 5A) that no objects are detected indicating that there is no need to mitigate the RF exposure levels.

Alternatively, if the electronic device 200 determines that an object is detected in either of the current frame or two frames (the current frame and the previous frame), then in step 1006, the electronic device 200 determines whether an object is detected from the current frame (whether $d_{cur}$ is true). If the electronic device 200 determines that an object is detected from the current frame, then in step 1008, the electronic device 200 determines whether detected peak is the same for both current-frame and two-frame processing. If detected peak is not the same for both current-frame and two-frame processing, then the electronic device 200 uses the current frame for angle estimation (step 1010). However, if the detected peak is the same for both current-frame and two-frame processing (as determined in step 1008), then the electronic device 200, in step 1012, uses the two frames for angle estimation.

If the electronic device 200 determines, in step 1006, that no object is detected from the current frame, then in step 1014, the electronic device 200 determines whether an object is detected from the previous frame. If the object is not detected in the previous frame (as determined in step 1014) then the electronic device 200, in step 1012, uses the two frames for angle estimation. Alternatively, if the object is detected in the previous frame (as determined in step 1014) then the electronic device 200, in step 1016, determines whether detected peak is the same for both previous-frame and two-frame processing. If detected peak is not the same for both previous-frame and two-frame processing, then the electronic device 200 uses the previous frame for angle estimation (step 1018). However, if the detected peak is the same for both previous-frame and two-frame processing (as determined in step 1016), then the electronic device 200, in step 1012, uses the two frames for angle estimation.

It is noted that the methods 600, 700, 800, 900 and 1000 are described with respect to detecting a single object. These methods are not limited to a single object. Rather, these methods can be used for each detected object.

Additionally, the methods of FIGS. 6 through 9 can be extended to more than two frames, as shown in the method 1100 as illustrated in FIG. 11. For example, FIG. 11 describes an example process of determining a number of frames for angel estimation, to use up to k frames, where k is an integer.

In step 1102, the electronic device determines whether an object is detected. If the object is not detected, then in step 1104, the electronic device determines that no object is detected. The electronic device 200 can then notify the RF exposure engine 426 of FIG. 4B (such as described above in step 570 of FIG. 5A) that no objects are detected indicating that there is no need to mitigate the RF exposure levels.

If the object is detected (as determined in step 1102), the electronic device in step 1106, determines whether to use the current frame for angle estimation. If the electronic device 200 determines to use the current frame for angle estimation, then in step 1108, the electronic device 200 uses the current frame for angle estimation. Alternatively, if the electronic device 200 determines to not use the current frame for angle estimation, then in step 1110, the electronic device 200 determines whether to use the two frames for angle estimation. If the electronic device 200 determines to use the two frames for angle estimation, then in step 1112, the electronic device 200 uses the two frame for angle estimation. Alternatively, if the electronic device 200 determines to not use the two frame for angle estimation, the process continues to determine a number of frames to use for angle estimation, similar to the steps 1106 and 1110. At step 1114, the electronic device 200 determines whether to use the less frame than the maximum number of frames (k) for angle estimation. Upon determining to use one less than the maximum number of frames, then the electronic device uses those frames for angle estimation (step 1116). Alternatively, the electronic device uses all of the frames (k frames) for angle estimation (step 1118).

Since there can be more than two frames, as described in the method 1100 of FIG. 11, the method 1200 of FIG. 12 describes an example where the number of frames, k, is set to three. It is noted that the method 1200 expands the method 800 of FIG. 8 from two frames to three frames.

As used in FIG. 12, the expression $d_{cur}$ is the detection status of a current frame. The expression $p_{cur}$ is the tap index of the detected object of the current frame. The expression $d_2$ is the detection status of two frames (the current frame and frame that preceded the current frame). The expression $p_2$ is the is the tap index when using two-frame processing (the current and second frame). The expressions $d_3$ and $p_3$ are the detection status and the detected peak, respectively, when using three-frame processing.

In step 1202, the electronic device 200 determines whether the object is detected using the current frame, two frames, or three frames. If the object is not detected in any of the frames, then the electronic device 200, in step 1204, determines that no object is detected. The electronic device 200 can notify the RF exposure engine 426 of FIG. 4B (such as described above in step 570 of FIG. 5A) that no objects are detected indicating that there is no need to mitigate the RF exposure levels.

Alternatively, if the electronic device 200 determines that an object is detected in any of the frames, then in step 1206, the electronic device 200 determines whether an object is detected from the current frame. If the electronic device 200 determines that an object is detected from the current frame, then in step 1208, the electronic device 200 determines whether detected peak is the same for both single-frame and two-frame processing. If detected peak is not the same for both single-frame and two-frame processing, then the electronic device 200 uses the current frame for angle estimation (step 1210).

If (i) the object is not detected in the current frame (as determined in step 1206) or (ii) the detected peak is the same for both single-frame and two-frame processing (as determined in step 1208), then the electronic device 200, in step 1212, determines whether the object is detected from the two frames (the current frame and the frame that preceded the current frame). If the object is not detected in the two frames (as determined in step 1212) then the electronic device 200, in step 1214, uses the three frames for angle estimation.

Alternatively, if the object is detected in the two frames (as determined in step 1212) then the electronic device 200, in step 1216 determines whether detected peak is the same for both two-frame and three-frame processing. If detected peak is not the same for both two-frame and three-frame processing, then the electronic device 200 uses the two frames for angle estimation (step 1218). If detected peak is the same for both two-frame and three-frame processing, then the electronic device 200 uses the three frames for angle estimation (step 1218).

Although FIGS. 6-12 illustrates various examples for determining the number of frames to use for angle estimation various changes may be made to FIGS. 6-12. For example, while shown as a series of steps, various steps in FIGS. 6-12 could overlap, occur in parallel, or occur any number of times.

Figure 13:
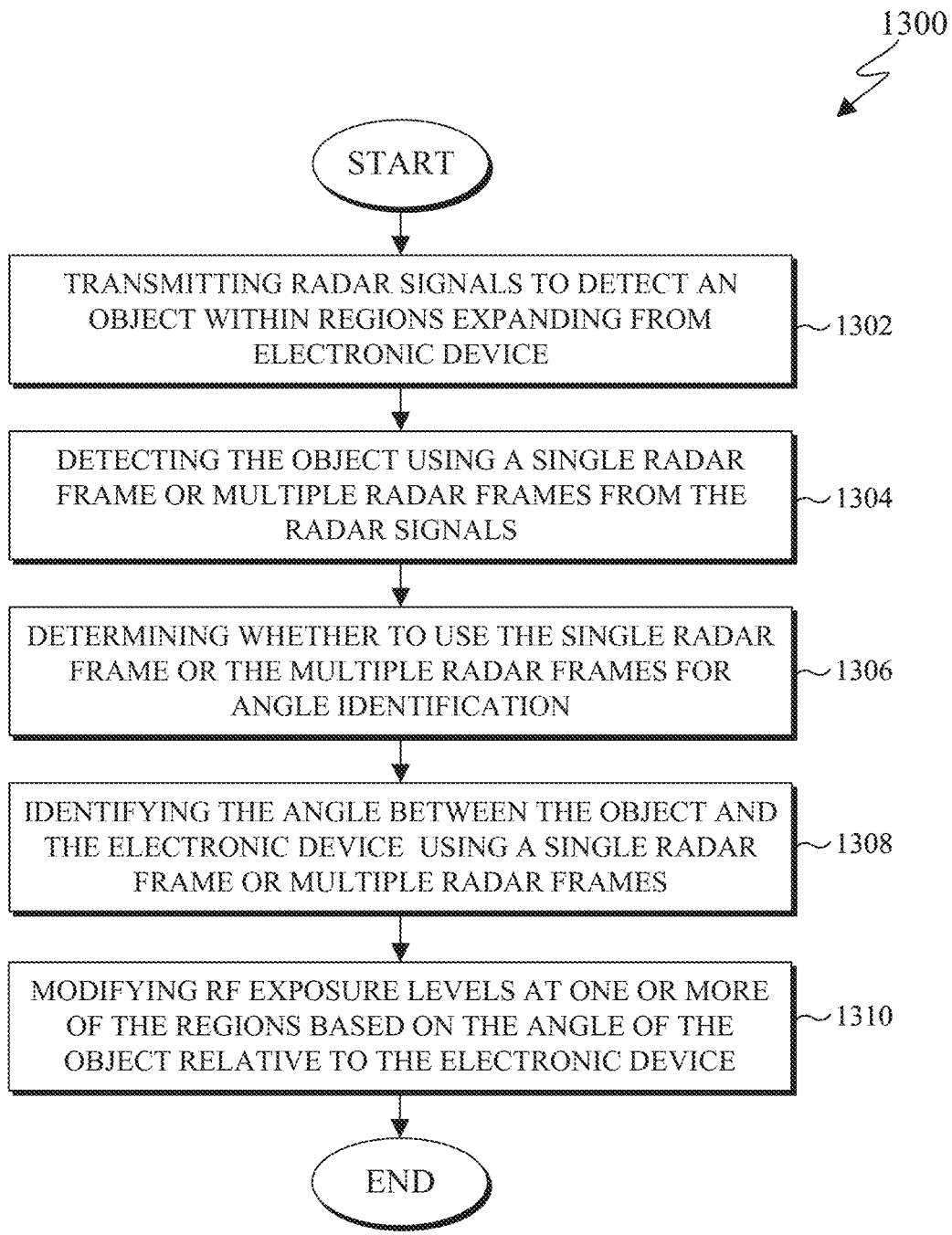
FIG. 13 illustrates an example method for modifying radio frequency exposure levels based on an identified angle between an electronic device and an object according to embodiments of this disclosure.

FIG. 13 illustrates an example method 1300 for modifying radio frequency exposure levels based on an identified angle between an electronic device and an object according to embodiments of this disclosure. The method 1300 is described as implemented by any one of the client device 106-114 of FIG. 1, the electronic device 300 of FIG. 3A the electronic device 410 of FIG. 4A and can include internal components similar to that of electronic device 200 of FIG. 2. However, the method 1300 as shown in FIG. 13 could be used with any other suitable electronic device and in any suitable system, such as when performed by the electronic device 200.

In step 1302, the electronic device 200 transmits signals for object detection. The electronic device 200 can also receive the transmitted signals that reflected off of an object via a radar transceiver, such as the radar transceiver 270 of FIG. 2. In certain embodiments, the signals are radar. The signals are used to detect an object with regions that expand from the electronic device.

In certain embodiments, the radar signals can be transmitted in frames that are separated by frame spacings. The transmission interval of a frame can be shorter than the frame spacing. The radar frames can include non-uniformly spaced radar pulses or uniformly spaced radar pulses.

In step 1304, the electronic device 200 detects an object using a single radar frame or multiple radar frames based on the transmitted signals. The electronic device 200 can detect an object based on reflections of the transmitted signals. In certain embodiments, the object is a body part of the user. The electronic device 200 can distinguish a body part from an inanimate object based on motion. For example, the longer the frame (or multiple frames separated by frame spacings) the electronic device 200 can identify motion from a detected object. When motion is present the electronic device can classify the object as a body part for which RF exposure need to be monitored and adjusted. Alternatively, if the electronic device 200 does not detect motion, then the RF exposure does not need to be monitored and the electronic device does not need to identify the angle between the object and the electronic device 200.

In step 1306, the electronic device 200 determines whether to use a single radar frame or multiple radar frames for angle identification. The determination of whether to use a single radar frame or multiple radar frames for angle identification can be based on a detection status of the body part using the single radar frame or the multiple radar frames. The determination of whether to use a single radar frame or multiple radar frames for angle identification can be based on a magnitude of a peak amplitude of the radar signals, the magnitude representing whether the body part is stationary or moving. The determination of whether to use a single radar frame or multiple radar frames for angle identification can be based on a change in location of the body part.

In step 1308, the electronic device 200 identifies the angle between the object and the electronic device 200 using a single radar frame or the multiple radar frames. For example, based on a determination to use the single radar frame, the electronic device 200 identifies the angle between the object and the electronic device using a single radar frame. For another example, based on a determination to use the multiple radar frames, the electronic device 200 identifies the angle between the object and the electronic device 200 using multiple radar frames.

In certain embodiments, the electronic device 200 identifies the angle between the object and the electronic device 200 using covariance values obtained based on averaging pulses within the one or more radar frames.

In step 1310, the electronic device 200 modifies the exposure level at one or more regions based on the identified angle that the object is relative to the electronic device 200.

Although FIG. 13 illustrates example methods, various changes may be made to FIGS. 13. For example, while the method 1300 is shown as a series of steps, various steps could overlap, occur in parallel, occur in a different order, or occur multiple times. In another example, steps may be omitted or replaced by other steps.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system. None of the description in this application should be read as implying that any particular element, step, or function is an essential element that must be included in the claims scope.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a radar transceiver; and
a processor operably connected to the radar transceiver, the processor configured to:
transmit, via the radar transceiver, radar signals to detect an object within regions expanding from the electronic device,
detect the object using a single radar frame or multiple radar frames from the radar signals,
determine whether to use the single radar frame or the multiple radar frames based on motion of the object for angle identification between the object and the electronic device by using a tap index of the single radar frame, a tap index of the multiple radar frames, or both,
identify an angle between the object and the electronic device using (i) the single radar frame based on a determination to use the single radar frame or (ii) the multiple radar frames based on a determination to use the multiple radar frames, and
modify radio frequency exposure levels at one or more of the regions based on the angle of the object relative to the electronic device.

2. The electronic device of claim 1, wherein:
the object is a body part of a user; and
to determine to use the single radar frame or the multiple radar frames is based on at least one of:
a detection status of the body part using the single radar frame or the multiple radar frames,
a magnitude of a peak amplitude of the radar signals, the magnitude representing whether the body part is stationary or moving, or
a change in location of the body part.

3. The electronic device of claim 1, wherein the radar signals are transmitted in frames of a first time duration that are separated by a frame spacing of a second time duration, wherein the second time duration is longer than the first time duration.

4. The electronic device of claim 1, wherein the processor is further configured to identify the angle using covariance values obtained based on averaging pulses within one or more radar frames.

5. The electronic device of claim 1, wherein to determine to use the single radar frame or the multiple radar frames to identify the angle, the processor is configured to:
determine whether the object is detected using the single radar frame;
in response to a detection of the object using the single radar frame, determine to identify the angle between the object and the electronic device using the single radar frame;
when the object is not detected using the single radar frame, detect the object using the multiple radar frames; and
in response to a detection of the object using the multiple radar frames, determine to identify the angle between the object and the electronic device using the multiple radar frames.

6. The electronic device of claim 1, wherein to determine to use the single radar frame or the multiple radar frames to identify the angle, the processor is configured to:
determine whether the object is detected using the single radar frame;
in response to a detection of the object using the single radar frame, compare a threshold to a peak amplitude of the single radar frame of the radar signals corresponding to the object;
determine to identify the angle between the object and the electronic device using the single radar frame based on a first result of the comparison;
when the object is not detected using the single radar frame or based on a second result of the comparison, detect the object using the multiple radar frames; and
in response to a detection of the object using the multiple radar frames, determine to identify the angle between the object and the electronic device using the multiple radar frames.

7. The electronic device of claim 1, wherein to determine to use the single radar frame or the multiple radar frames to identify the angle, the processor is configured to:
determine whether the object is detected using the single radar frame or the multiple radar frames;
in response to a determination that the object is detected using the single radar frame or the multiple radar frames, determine whether the object is detected using the single radar frame;
in response to a determination that the object is detected using the single radar frame, determine whether the tap index of the single radar frame matches the tap index of the multiple radar frames;
in response to a determination that (i) the tap index of the single radar frame matches the tap index of the multiple radar frames or (ii) the object is not detected using the single radar frame, determine to identify the angle between the object and the electronic device using the multiple radar frames; and
in response to a determination that the tap index of the single radar frame does not match the tap index of the multiple radar frames, determine to identify the angle between the object and the electronic device using the single radar frame.

8. The electronic device of claim 1, wherein to determine to use the single radar frame or the multiple radar frames to identify the angle, the processor is configured to:
determine whether the object is detected using the single radar frame;
in response to a determination that the object is not detected using the single radar frame, detect the object using the multiple radar frames;
in response to a detection of the object using the multiple radar frames, determine to identify the angle between the object and the electronic device using the multiple radar frames;
in response to a detection of the object using the single radar frame, compare a threshold to a peak amplitude of the single radar frame of the radar signals corresponding to the object;
in response to the comparison generating a first result, determine to identify the angle between the object and the electronic device using the single radar frame;
in response to the comparison generating a second result, detect the object using the multiple radar frames;
in response to a detection of the object using the multiple radar frames based on the second result, determine whether the tap index of the single radar frame matches the tap index of the multiple radar frames;
in response to a determination that the tap index of the single radar frame matches the tap index of the multiple radar frames, determine to identify the angle between the object and the electronic device using the multiple radar frames; and in response to a determination that the tap index of the single radar frame does not match the tap index of the multiple radar frames, determine to identify the angle between the object and the electronic device using the single radar frame.

9. The electronic device of claim 1, wherein:
the single radar frame is a current radar frame,
the multiple radar frames include the current radar frame and a previous radar frame; and
to determine to use the single radar frame or the multiple radar frames to identify the angle, the processor is configured to:
  determine whether the object is detected using the current radar frame or the multiple radar frames,
  in response to a determination that the object is detected using the current radar frame or the multiple radar frames, determine whether the object is detected using the current radar frame,
  in response to a determination that the object is detected using the current radar frame, determine whether the tap index of the current radar frame matches the tap index of the multiple radar frames,
  in response to a determination that the tap index of the current radar frame does not match the tap index of the multiple radar frames, determine to identify the angle between the object and the electronic device using the current radar frame,
  in response to a determination that the object is not detected using the current radar frame, determine whether the object is detected using the previous radar frame,
  in response to a determination that the object is detected using the previous radar frame, determine whether a tap index of the previous radar frame matches the tap index of the multiple radar frames,
  in response to a determination that the tap index of the previous radar frame does not match the tap index of the multiple radar frames, determine to identify the angle between the object and the electronic device using the previous radar frame, and
  in response to a determination that (i) the tap index of the current radar frame matches the tap index of the multiple radar frames, (ii) the object is not detected using the previous radar frame, or (iii) the tap index of the previous radar frame matches the tap index of the multiple radar frames, determine to identify the angle between the object and the electronic device using the multiple radar frames.

10. The electronic device of claim 1, wherein:
the single radar frame is a current radar frame;
the multiple radar frames include the current radar frame and a number of previous radar frames; and
to determine to use the single radar frame or the multiple radar frames to identify the angle, the processor is configured to:
  in response to a determination that the object is detected, determine whether to use the current radar frame to identify the angle,
  in response to a determination to use the current radar frame, determine to identify the angle between the object and the electronic device using the current radar frame,
  in response to a determination to not use the current radar frame, identify a number of the previous radar frames to identify the angle, and
  determine to identify the angle between the object and the electronic device using the current radar frame and the identified number of the previous radar frames, the identified number of the previous radar frames directly precede the current radar frame.

11. A method comprising:
transmitting radar signals to detect an object within regions expanding from an electronic device;
detecting the object using a single radar frame or multiple radar frames from the radar signals;
determining whether to use the single radar frame or the multiple radar frames based on motion of the object for angle identification between the object and the electronic device by using a tap index of the single radar frame, a tap index of the multiple radar frames, or both;
identifying an angle between the object and the electronic device using (i) the single radar frame based on a determination to use the single radar frame or (ii) the multiple radar frames based on a determination to use the multiple radar frames; and
modifying radio frequency exposure levels at one or more of the regions based on the angle of the object relative to the electronic device.

12. The method of claim 11, wherein:
the object is a body part of a user; and
determining to use the single radar frame or the multiple radar frames is based on at least one of:
  a detection status of the body part using the single radar frame or the multiple radar frames,
  a magnitude of a peak amplitude of the radar signals, the magnitude representing whether the body part is stationary or moving, or
  a change in location of the body part.

13. The method of claim 11, wherein the radar signals are transmitted in frames of a first time duration that are separated by a frame spacing of a second time duration, wherein the second time duration is longer than the first time duration.

14. The method of claim 11, further comprising identifying the angle using covariance values obtained based on averaging pulses within one or more radar frames.

15. The method of claim 11, wherein determining to use the single radar frame or the multiple radar frames to identify the angle, comprises:
determining whether the object is detected using the single radar frame;
in response to a detection of the object using the single radar frame, determining to identify the angle between the object and the electronic device using the single radar frame;
when the object is not detected using the single radar frame, detecting the object using the multiple radar frames; and
in response to a detection of the object using the multiple radar frames, determining to identify the angle between the object and the electronic device using the multiple radar frames.

16. The method of claim 11, wherein determining to use the single radar frame or the multiple radar frames to identify the angle, comprises:
determining whether the object is detected using the single radar frame;

in response to a detection of the object using the single radar frame, comparing a threshold to a peak amplitude of the single radar frame of the radar signals corresponding to the object;

determining to identify the angle between the object and the electronic device using the single radar frame based on a first result of the comparison;

when the object is not detected using the single radar frame or based on a second result of the comparison, detecting the object using the multiple radar frames; and in response to a detection of the object using the multiple radar frames, determining to identify the angle between the object and the electronic device using the multiple radar frames.

17. The method of claim 11, wherein determining to use the single radar frame or the multiple radar frames to identify the angle, comprises:

determining whether the object is detected using the single radar frame or the multiple radar frames;

in response to a determination that the object is detected using the single radar frame or the multiple radar frames, determining whether the object is detected using the single radar frame;

in response to a determination that the object is detected using the single radar frame, determining whether the tap index of the single radar frame matches the tap index of the multiple radar frames;

in response to a determination that (i) the tap index of the single radar frame matches the tap index of the multiple radar frames or (ii) the object is not detected using the single radar frame, determining to identify the angle between the object and the electronic device using the multiple radar frames; and in response to a determination that the tap index of the single radar frame does not match the tap index of the multiple radar frames, determining to identify the angle between the object and the electronic device using the single radar frame.

18. The method of claim 11, wherein determining to use the single radar frame or the multiple radar frames to identify the angle, comprises:

determining whether the object is detected using the single radar frame;

in response to a determination that the object is not detected using the single radar frame, detecting the object using the multiple radar frames;

in response to a detection of the object using the multiple radar frames, determining to identify the angle between the object and the electronic device using the multiple radar frames;

in response to a detection of the object using the single radar frame, comparing a threshold to a peak amplitude of the single radar frame of the radar signals corresponding to the object;

in response to the comparison generating a first result, determining to identify the angle between the object and the electronic device using the single radar frame;

in response to the comparison generating a second result, detecting the object using the multiple radar frames;

in response to a detection of the object using the multiple radar frames based on the second result, determining whether the tap index of the single radar frame matches the tap index of the multiple radar frames;

in response to a determination that the tap index of the single radar frame matches the tap index of the multiple radar frames, determining to identify the angle between the object and the electronic device using the multiple radar frames; and in response to a determination that the tap index of the single radar frame does not match the tap index of the multiple radar frames, determining to identify the angle between the object and the electronic device using the single radar frame.

19. The method of claim 11, wherein:

the single radar frame is a current radar frame, the multiple radar frames include the current radar frame and a previous radar frame; and determining to use the single radar frame or the multiple radar frames to identify the angle, comprises:

determining whether the object is detected using the current radar frame or the multiple radar frames, in response to a determination that the object is detected using the current radar frame or the multiple radar frames, determining whether the object is detected using the current radar frame, in response to a determination that the object is detected using the current radar frame, determining whether the tap index of the current radar frame matches the tap index of the multiple radar frames, in response to a determination that the tap index of the current radar frame does not match the tap index of the multiple radar frames, determining to identify the angle between the object and the electronic device using the current radar frame, in response to a determination that the object is not detected using the current radar frame, determining whether the object is detected using the previous radar frame, in response to a determination that the object is detected using the previous radar frame, determining whether a tap index of the previous radar frame matches the tap index of the multiple radar frames, in response to a determination that the tap index of the previous radar frame does not match the tap index of the multiple radar frames, determining to identify the angle between the object and the electronic device using the previous radar frame, and in response to a determination that (i) the tap index of the current radar frame matches the tap index of the multiple radar frames, (ii) the object is not detected using the previous radar frame, or (iii) the tap index of the previous radar frame matches the tap index of the multiple radar frames, determining to identify the angle between the object and the electronic device using the multiple radar frames.

20. A non-transitory computer readable medium embodying a computer program, the computer program comprising computer readable program code that, when executed by a processor of an electronic device, causes the processor to:

transmit radar signals to detect an object within regions expanding from the electronic device;

detect the object using a single radar frame or multiple radar frames from the radar signals;

determine whether to use the single radar frame or the multiple radar frames based on motion of the object for angle identification between the object and the electronic device by using a tap index of the single radar frame, a tap index of the multiple radar frames, or both;

identify an angle between the object and the electronic device using (i) the single radar frame based on a determination to use the single radar frame or (ii) the multiple radar frames based on a determination to use the multiple radar frames; and modify radio frequency exposure levels at one or more of the regions based on the angle of the object relative to the electronic device.

* * * * *